US007502657B2

(12) United States Patent
Nakata et al.

(10) Patent No.: US 7,502,657 B2
(45) Date of Patent: Mar. 10, 2009

(54) INFORMATION PROCESSING APPARATUS, INFORMATION PROCESSING METHOD, AND STORAGE MEDIUM

(75) Inventors: Yohei Nakata, Tokyo (JP); Keisuke Inoue, Kanagawa (JP); Junichiro Sakata, Tokyo (JP)

(73) Assignee: Sony Corporation, Tokyo (JP)

( * ) Notice: Subject to any disclaimer, the term of this patent is extended or adjusted under 35 U.S.C. 154(b) by 1182 days.

(21) Appl. No.: 10/206,088

(22) Filed: Jul. 29, 2002

(65) Prior Publication Data

US 2003/0028516 A1 Feb. 6, 2003

(30) Foreign Application Priority Data

Jul. 30, 2001 (JP) ............................ 2001-229079

(51) Int. Cl.
*G06F 17/00* (2006.01)

(52) U.S. Cl. ........................................................ 700/94

(58) Field of Classification Search ................... 700/94; 84/600-604, 17, 423 R, 14
See application file for complete search history.

(56) References Cited

U.S. PATENT DOCUMENTS 5,866,833 A * 2/1999 Wakuda et al. ................ 84/609
6,444,890 B2 * 9/2002 Kondo .......................... 84/653
6,448,486 B1 * 9/2002 Shinsky ....................... 84/613
2002/0019990 A1 * 2/2002 Sincaglia et al. ............ 725/142
2002/0108484 A1 * 8/2002 Arnold et al. ................. 84/615

* cited by examiner

*Primary Examiner*—Curtis Kuntz
*Assistant Examiner*—Andrew C Flanders
(74) *Attorney, Agent, or Firm*—Oblon, Spivak, McClelland, Maier & Neustadt, P.C.

(57) ABSTRACT

An information processing apparatus/method allows a user to interactively combine a plurality of sound chips into music data, edit music data, and play it back, by inputting data or commands via a keyboard or a mouse. A chip such as a sound pattern, a one-shot patter, or an effect to be applied to a sound pattern or a one-shot pattern is assigned to each key of a keyboard. If a user presses a key, a chip corresponding to a pressed key is executed. When a plurality of keys are simultaneously pressed, corresponding chips are played in a superimposed fashion. A piece of music can be composed by sequentially pressing various keys thereby sequentially combining corresponding chips.

28 Claims, 13 Drawing Sheets

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, an information processing method, and a storage medium, which allow a user to enjoy editing and playing back a content such as an audio content, and more particularly, to an information processing apparatus, an information processing method, and a storage medium, which allow a user to enjoy interactively editing and playing back a content such as an audio content, using a user input device such as a keyboard or a mouse. Still more specifically, the present invention relates to an information processing apparatus, an information processing method, and a storage medium, which have a capability of combining a plurality of contents such as audio contents or other types of contents in response to user inputs given via a user input device such as a keyboard or a mouse thereby allowing a user to enjoy editing and playing back such contents, in particular, to an information processing apparatus, an information processing method, and a storage medium, which have a capability of immediately capturing user inputs given via a user input device and combining a plurality of contents such as audio contents or other types of contents in response to the user inputs thereby allowing a user to enjoy editing and playing back such contents.

2. Description of the Related Art

As a result of advances in semiconductor technology and information technology in recent years, personal computers (PCs) and inexpensive high-performance computer systems called work stations (WSs) have become very popular. Various kinds of applications can be executed in a computer environment provided by such a computer system in conjunction with an operating system (OS).

An extremely wide variety of applications can be executed on a computer system. Some examples are a word processor, a spreadsheet, a database, a communication program, and a graphics program. A computer system having high computer power or having a high-performance graphics accelerator can easily create and display a high-reality 2D or 3D graphics image and perform an image conversion on such a graphics image. Using a computer system, it is also possible to editing an audio content by combining a plurality of sound elements, applying an effect (sound effect) to a sound element, and/or time-sequentially arranging sound elements. A user can enjoy playing back an edited audio content. Furthermore, when an audio content is played back, an image (a motion image or a still image) can be displayed in synchronization with the audio content. This provides enhanced visual effects.

A process of editing or playing back an audio content on a computer system such as a personal computer (PC) is discussed in detail below.

An audio content may include a plurality of performance layers of sound elements such as a "sound pattern" and a "one-shot pattern" such as a percussion or a chant and an "effect" for applying a sound effect such as a delay or an echo to sound elements. A new audio content can be created by simultaneously or time-sequentially combining various sound elements in performance layers and by further time-sequentially arranging the resultant combined sound elements.

A dedicated hardware device such as a DJ (disk jockey) playback device for editing and playing back an audio content is known. Such a dedicated hardware device generally includes analog-type user interfaces, such as a volume label, provided for respective parameters such as sound elements or effects, thereby allowing a user to easily edit and play back an audio content. Furthermore, an operator, i.e., a DJ, can modify or change, in real time, a content being played back by operating an analog switch even in the middle of performance or playback of an audio content.

In contrast, when an audio content is edited using a personal computer, editing is performed using a traditional computer user interface such as a mouse or a keyboard. Such a user interface is of the digital type, and is not necessarily suitable for dealing with an audio content including a plurality of sound elements. To modify or change a sound element or an effect in the middle of performance or playback of music, it is required to capture, with a mouse cursor, a corresponding object on a GUI (Graphical User Interface) screen. This makes it difficult to perform an operation in real time.

To simultaneously apply a plurality of effects to an audio content, it is required to turn on/off all corresponding effect pattern switches by operating them one by one or to perform dragging using the mouse cursor to change parameters of effect patterns. Although such an operation using the GUI is suitable for fine adjustment of a parameter, it is difficult to deal with a content in real time.

SUMMARY OF THE INVENTION

It is an object of the present invention to provide an excellent information processing apparatus, information processing method, and storage medium, which allow a user to enjoy editing and playing back a content such as an audio content via an interactive operation using a keyboard or a mouse.

It is still another object of the present invention to provide an excellent information processing apparatus, information processing method, and storage medium, which have a capability of simultaneously or sequentially combining a plurality of contents such as audio contents or other types of contents in response to a user input given via a user input device such as a keyboard or a mouse, thereby providing an interactive editor/playback environment to a user.

It is still another object of the present invention to provide an excellent information processing apparatus, information processing method, and storage medium, which have a capability of instantaneously capturing a user input issued via a user input device, and simultaneously or sequentially combining a plurality of contents such as audio contents or other types of contents in response to a user input, thereby providing an interactive editor/playback environment to a user.

According to a first aspect of the present invention, there is provided an information processing apparatus/method for playing back a content in response to a user input operation performed on one or more keys, the apparatus/method comprising: a key assigning means/step for assigning a content to a key; a user input detection means/step for detecting a user input operation performed on a key; and a content output means/step for outputting a content corresponding to a key detected to be subjected to a user input operation.

Each content dealt with by the information processing apparatus/method according to the first aspect of the present invention may include a plurality of layers including a "pattern" serving as a principal element of the content, such as a still image, a motion image, or a sound, an "effect" serving to apply an active process to a specific content, and a short content called a "one-shot" pattern. Patterns are contents that are longer in time than one-shot patterns. In the case of an audio content, a pattern is called a "sound pattern". A specific example of a sound pattern is a sound chip such as a loop pattern. An audio content may include a plurality of performance layers including a combination or a repetition of one or more sound patters, an effect serving to apply a sound effect such as a delay or an echo to each sound pattern, and a one-shot pattern which is a short sound chip such as a percussion or a drum (one-shot patterns are not output continuously). Each content may further include, in addition to an audio content, an image content such as a background movie which is displayed in synchronization with music being played.

In the information processing apparatus/method according to the first aspect of the present invention, a chip such as a sound pattern, a one-shot patter, or an effect to be applied to a sound pattern or a one-shot pattern is assigned to each key of a keyboard. If a user presses one of these keys, a chip corresponding to the pressed key is executed, that is, the chip is played. In a case in which a plurality of keys are simultaneously pressed, sounds corresponding chips are output in a mixed fashion. A piece of music can be played by sequentially pressing a plurality of keys thereby time-sequentially combining corresponding chips. A piece of music played may be recorded.

The key assigning means/step may accept changing of key assignment, even when a content is being output by the content output means.

The key assigning means may have a toggling capability of continuously outputting a content corresponding to a key subjected to a user input operation, even after the user input operation has been released. The toggling capability is provided to a key to which a sound pattern or an effect is assigned, so that, when the toggling capability is active, a key is maintained, even after a user input operation has been released, in a state equivalent to a state in which the user input operation on the key is continued. However, the toggling capability is not provided to a key to which a one-shot pattern is assigned. In the user input detecting step, an input operation performed on a toggle key is detected, which causes a content, corresponding to a key subjected to a user input operation, to be continuously output even after the user input operation has been released.

In the key assigning means/step, a set of keys assigned sound patterns may be registered as a pattern pack, a set of keys assigned one-shot patterns as a one-shot pack, and a set of keys assigned effects as an effect pack. One or more pattern packs, one or more one-shot packs, and one or more effect packs may be registered. Furthermore, a combination of a pattern pack, a one-shot pack, and an effect pack may be registered as a sound pack.

In the content output means/step, when a key assigned a sound pattern or an effect is continuously subjected to a user input operation, a content corresponding to said key is continuously output throughout a period during which the user input operation is continued, but, when a key assigned a one-shot pattern is continuously subjected to a user input operation, a content is output only once. Herein, "continuously outputting a content" refers to outputting a content assigned to a pressed key from its beginning to its end continuously with no break.

In the key assigning means/step, both an audio content and an image content may be assigned to a single key. In this case, in the content output means/step, an audio content corresponding to a key detected to be subjected to a user input operation is acoustically output, and, at the same time, a corresponding image content such as a background movie is displayed to enhance visual effects in performance of music.

According to a second aspect of the present invention, there is provided a storage medium in which computer software for causing a computer system to execute a process of playing back or editing a content in response to a user input operation performed on one or more keys is stored in a computer-readable form, said computer software comprising the steps of: assigning a content to a key; detecting a user input operation performed on a key; and outputting a content corresponding to the key detected to be subjected to the user input operation.

The storage medium according to the second aspect of the present invention may be used to provide a computer program in a computer-readable form to a general-purpose computer system executable of various program codes. A specific example of a storage medium is a removable and portable storage medium such as a CD (Compact Disc), an FD (Floppy Disk), an MO (Magneto-Optical Disc). Technically, it is also possible to provide computer software in a computer-readable form to a particular computer system via a network (either a wireless network or a cable network).

The program storage medium defines a cooperative relationship in structure or function, for realizing a function of a particular computer program on a computer system, between the computer program and the storage medium. That is, by installing particular computer software onto a computer system via a storage medium according to the second aspect of the present invention, a cooperative operation with the computer system becomes possible thereby making it possible to perform an operation equivalent to that achieved by the information processing apparatus/method according to the first aspect of the present invention.

These and other objects and features of the present invention will become more apparent from the following detailed description of embodiments with reference to the accompanying drawings.

DESCRIPTION OF THE PREFERRED EMBODIMENTS

As described above, the present invention provides a technique of using a computer system such as a personal computer (PC) to capture, in real time, a user input operation performed on a user input device such as a keyboard or a mouse (or a touchpad) and simultaneously and/or sequentially combine a plurality of contents in response to the user input operation thereby allowing a user to interactively edit and/or play back contents such as audio contents and other types of contents. The present invention is described in further detail below with reference to preferred embodiments in conjunction with the accompanying drawings.

Figure 1:
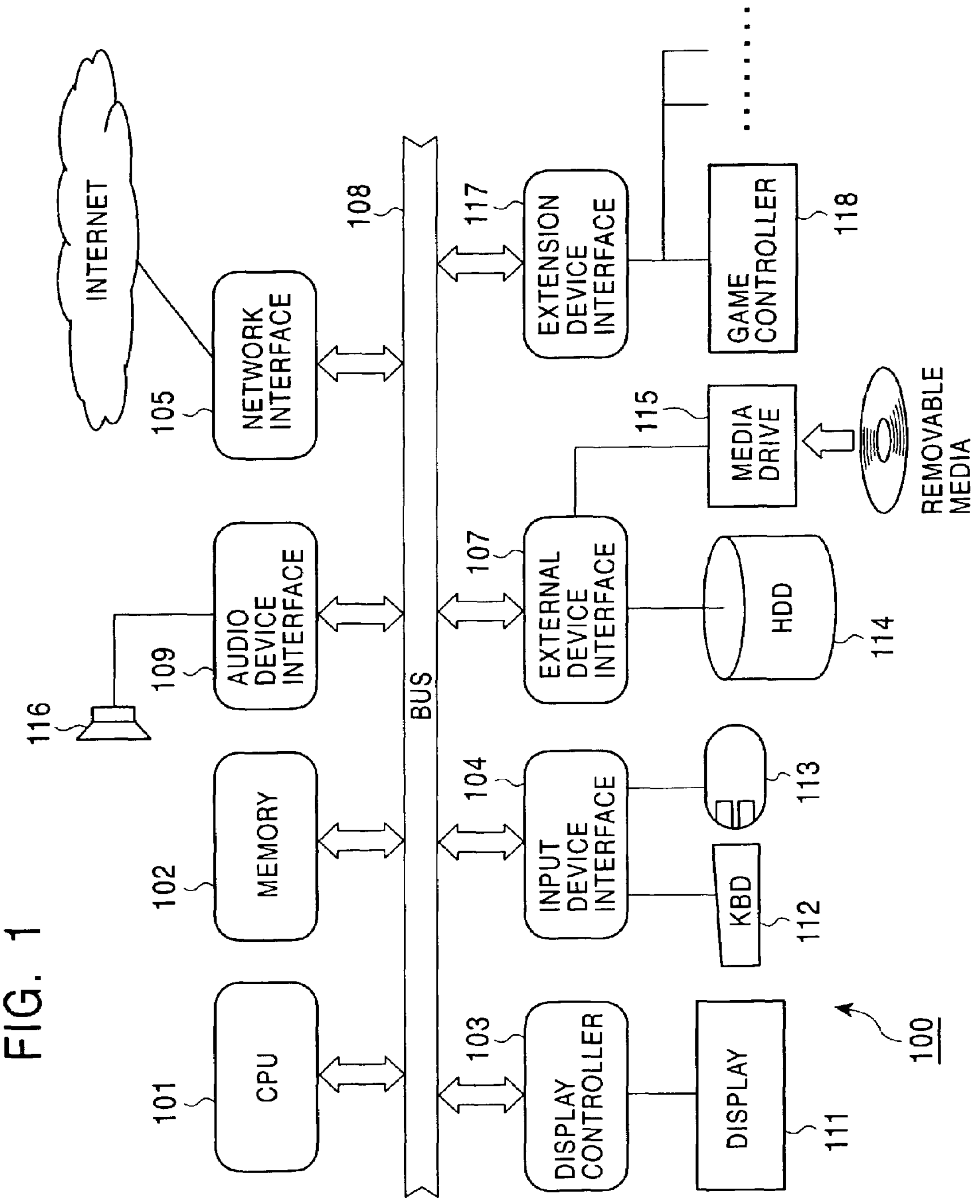
FIG. 1 is a diagram schematically illustrating a hardware configuration of a computer system suitable for implementing the present invention.

FIG. 1 is a diagram illustrating a hardware configuration of a computer system 100 which provides a content editor/playback environment excellent in interactivity and real-time responsivity, according to the present invention. Respective modules of the computer system 100 are described below with reference to FIG. 1.

The system 100 includes a CPU (Central Processing Unit) 101 that executes various applications under the control of an operating system (OS). The CPU 101 is capable of executing audio content processing software to edit or play back an audio content including, for example, sound elements such as a "sound pattern" and a "one-shot pattern" such as a percussion or a chant and an "effect" for applying a sound effect such as a delay or an echo to sound elements. As shown in FIG. 1, the CPU 101 is connected to other devices (described later) via a bus 108.

A memory 102 serves to store a program code executed by the CPU 101 and to temporarily store work data being processed. Herein, the memory 102 shown in FIG. 1 may include both nonvolatile and volatile memories.

A display controller 103 is a controller dedicated to actually executing a graphics command issued by the CPU 101. Graphics data processed by the display controller 103 is temporarily stored in a frame buffer (not shown) or the like, and then is displayed on the screen of a display 111.

An input device interface 104 serves to connect a user input device such as a keyboard 112 or a mouse 113 to the computer system 100. The computer system 100 may further include another type of coordinate pointing device such as a trackpad or a trackpoint for inputting coordinate data in a specific operating plane.

In response to a user operation such as key pressing or dragging performed on the keyboard 112 or the mouse 113, the input device interface 104 issues an interrupt request (IRQ) to the CPU 101. In response to the interrupt request, the CPU 101 executes an interrupt handler to interpret a command given by a key operation or detect coordinates designated by the mouse or changes in coordinates. The audio content processing software according to the present embodiment is capable of capturing, in real time, a user input given via the user input device 112/113 and reflecting it, in real time, in editing or playing back of an audio content.

A network interface 105 serves to interface the system 100 with a LAN (Local Area Network) or a wide area network such as the Internet, in accordance with a predetermined communication protocol such as Ethernet.

A plurality of host terminals (not shown) are connected transparently via the network such that a distributed computing environment is built. Software programs and data contents can be transmitted or distributed via the network. For example, audio content processing software can be downloaded via a network, and it can be used to edit or play back an audio content including "sound patterns" which are principal sound elements of music, "one-shot patterns" such as a percussion or a chant, and "effects" for applying sound effects such as a delay or an echo to the sound elements. It is also possible to transmit or distribute, via the network, sound parts (sound element data), such as a sound pattern, a one-shot pattern, and an effect, used in editing or playing back an audio content, or music or an audio content created via editing using the audio content processing software.

An external device interface 107 serves to connect an external device such as a hard disk drive (HDD) 114 or a media drive 115 to the system 100.

The HDD 114 is an external storage device including a fixed magnetic disk serving as a storage medium (as is known in the art) and is superior to other types of external storage devices in terms of the storage capacity and data transfer rate. A software program may be stored in an executable form on the HDD 114. This is called installation of a program into a system. In general, programs such as a program code of an operating system, an application program, and a device driver, which are to be executed by the CPU 101, are stored in a nonvolatile fashion on the HDD 114.

More specifically, the HDD 114 is used to store, for example, audio content processing software for editing or playing back an audio content including sound elements such as a "sound pattern" and "one-shot patterns" such as a percussion or a chant and "effects" for applying sound effects such as a delay or an echo to sound elements. The HDD 114 can also be used to store sound parts (sound element data), such as a sound pattern, a one-shot pattern, and an effect, used in editing or playing back an audio content. Furthermore, the HDD 114 can also be used to store music or an audio content created via editing using the audio content processing software.

The media driver 115 serves to access data storage surface of a removable medium such as a CD (Compact Disc), an MO (Magneto-optical disc), or a DVD (Digital Versatile Disc) mounted thereon.

A removable medium is generally used to back up data such as a software program or a data file in a computer-readable form or used to transfer (or sell or distribute) data between systems. For example, audio content processing software, for editing or playing back an audio content including sound elements such as a "sound pattern" and "one-shot patterns" such as a percussion or a chant and "effects" for applying sound effects such as a delay or an echo to sound elements, can be supplied or distributed among a plurality of devices by physically transporting a removable medium on which such audio content processing software is stored. A removable medium can also be used to supply or distribute, to or among devices, sound parts (sound element data), such as a sound pattern, a one-shot pattern, and an effect, used in editing or playing back an audio content, or music or an audio content created via editing using the audio content processing software, by physically transporting a removable medium on which such data is stored.

An audio device interface 109 converts digital audio data into analog form, amplifies the resultant analog audio data, and outputs it via a speaker 116 to the outside. In the present embodiment, music or an audio content, formed by simultaneously and/or sequentially combining sound parts such as "sound patterns" and "one-shot patterns" such as a percussion or a chant and "effects" for applying sound effects such as a delay or an echo to sound parts, is acoustically output via the speaker 116.

An extension device interface 117 is used to interface with an extension device such as a game controller 118 or a user input device (not shown). A plurality of peripheral devices according to, for example, the USB (Universal Serial Bus) interface standard can be dynamically connected or disconnected to or from the extension device interface 117.

An example of such a computer system 100 shown in FIG. 1 is an IBM PC/AT (Personal Computer/Advanced Technology)compatible personal computer or a personal computer of an upgraded version. Of course, a computer based on another different architecture may be employed as the computer system 100.

Processing performed on an audio content by the computer system 100 is described below. In practice, processing on an audio content is performed by executing, on the CPU 101, an audio content processing software capable of editing and playing back the audio content in real time.

Using the audio content processing software according to the present embodiment, music can be created by time-sequentially combining sound elements such as a melody, a rhythm, and a one-shot element or by superimposing (simultaneously combining) such sound elements. The resultant music is acoustically output by a speaker 116. Thus, the computer system 100 can function as a "musical instrument".

When an audio content is being played back, if a user input is issued via a user input device such as the keyboard 112 or the mouse 113, the user input is captured and reflected in real time in the music being played. Thus, a user can enjoy playing music in a DJ (disk jockey)-like fashion on the computer system 100. Furthermore, by displaying an image on the screen of the display 111 in synchronization with the audio output and reflecting a user input in real time in the displayed image, a user can enjoy playing music in a VJ (visual jockey)-like fashion.

Each content dealt with by the computer system 100 according to the present embodiment may include a plurality of layers including a "pattern" serving as a principal element of the content, such as a still image, a motion image, or a sound, an "effect" serving to apply an active process to a specific content, and a "one-shot" pattern which is a content short in time. Patterns are contents that are longer in time than one-shot patterns. In the case of an audio content, a pattern is called a "sound pattern". A specific example of a sound pattern is a sound element such as a loop pattern. An audio content may include a plurality of performance layers including a combination or a repetition of one or more sound patters, an effect serving to apply a sound effect such as a delay or an echo to each sound pattern, and a one-shot pattern which is a short sound element such as a percussion or a drum (one-shot patterns are not output continuously).

Of course, in addition to audio contents, it is also possible to edit and play back other types of contents such as a still image or a motion image in real time using the computer system 100.

Figure 2:
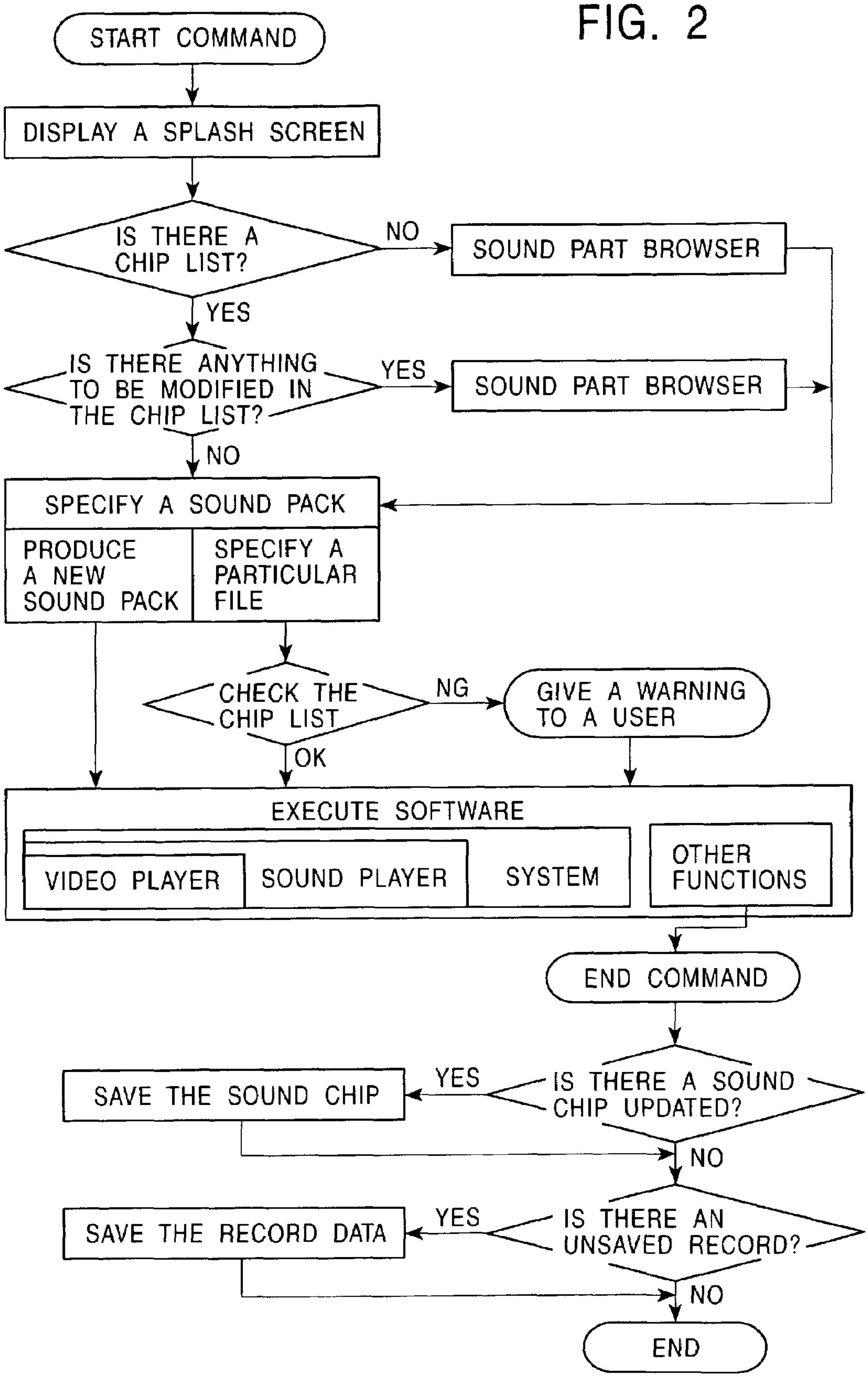
FIG. 2 is a flow chart showing a process which starts when audio content processing software according to an embodiment of the present invention is started and which ends when the audio content processing software is ended.

FIG. 2 is a flow chart showing a process which starts when the audio content processing software according to the present embodiment is started and which ends when the audio content processing software is ended.

The audio content processing software is started in response to a start command issued by a user by, for example, double-clicking a corresponding application icon on a GUI screen (not shown) of the computer system 100.

When the audio content processing software is started, a "splash" screen (not shown) is first displayed to draw a user's attention, and then it is determined whether there is a "chip list" listing chips (sound chips), for example, sound elements such as sound patterns and one-shot patterns to be processed by the audio content processing software and effects to be applied to sound elements.

In a case in which no chip list is detected, a sound part browser (described later) is displayed to prompt a user to produce a list.

Thereafter, it is determined whether there is something to be modified in the chip list. If it is determined that a modification is required, the sound part browser is displayed to prompt the user to make a modification of the chip list.

If the user specifies a sound pack to be used in performance of music, the main part of the audio content processing software is started. A sound pack includes (as will be described in detail later) a set (pattern pack) of sound patterns assigned to specific keys used in performance, a set (one-shot pack) of one-shot patterns assigned to specific keys used in performance, and a set (effect pack) of effects assigned to specific keys used in performance. In a case in which an existing sound pack is specified, the main part of the audio content processing software is started after checking the chip list to verify the specified sound pack.

The audio content processing software includes a "sound player", a "video player", a "system", and other functions. The details of the "sound player", the "video player", and the "system" will be described later.

If the user issues an end command by selecting an "exit" button in a file menu or clicking an end button located on the right-hand end of a title bar, the audio content processing software is ended.

In the ending routine, it is checked whether a sound chip such as a sound element or an effect was modified in the process performed by the audio content processing software. In a case in which a modified sound chip is detected, it is saved if the user wants to do so. In a case in which there is unsaved record data, it is also saved if the user wants to do so.

Functional modules of the audio content processing software according to the present embodiment are described below.

Sound Player

The sound player is a functional module serving to "play" an audio content. When an audio content is being played, the sound player captures, in real time, a user input issued via a user input device such as the keyboard 112 or the mouse 113 provided in the computer system 100.

The sound player has chips (sound element data) assigned to respective keys of the keyboard 112. Specific examples of chips are sound patterns which are principal sound elements of music, one-shot patterns or similar sound elements such as a percussion or a drum, and effects (sound effects) such as a delay or a echo applied to sound elements. If a user presses one of these keys, a chip corresponding to the pressed key is executed. In a case in which a plurality of keys are simultaneously pressed, sounds corresponding chips are output in a superimposed fashion. On the other hand, if keys (or combinations of keys) are sequentially pressed, corresponding chips are time-sequentially combined.

If a key is released from a pressed state, execution of a corresponding chip is stopped. Sound patterns can also be played in a toggle mode (described later). In this case, a sound pattern corresponding to a toggled-on key is acoustically output until the same key is toggled-off. In general, because of limitation in hardware, the maximum number of keys the keyboard 112 can accept when they are simultaneously pressed is limited to 3. However, if the toggling capability according to the present embodiment is used, three or more designated chips can be played in a superimposed fashion.

Each effect includes a plurality of parameters. In the present embodiment, each parameter can be modified in real time in response to changes in coordinates pointed to by a coordinate pointing device such as the mouse 113 (as will be described later).

The sound player includes an "automatic sound adjuster" for automatically making a correction in playing of an audio content performed in response to key operations, a "master volume controller" for controlling the total sound volume, a "pattern player" for reproducing a sound element (chip) registered as a sound pattern, a "one-shot player" for reproducing a sound element (chip) registered as a one-shot sound, an "effector" for applying a sound effect (chip) registered as an effect, and a "pack changer" for changing a pattern among various pattern sets.

In a mode in which the automatic sound adjuster is active, the automatic sound adjuster automatically adjust the timing of reflecting a user key operation into the operation of the pattern player, the one-shot player, or the effector.

If music is played in a mode in which the automatic sound adjuster is inactive, a user input is reflected in real time in the music being played.

In the mode in which the automatic sound adjuster is active, the automatic sound adjuster determines reference timings corresponding to sixteenth notes on the basis of the BPM (Beats per Minute) specified in a sound pack and adjusts the sounding timing in accordance with a specified timing mode set in the automatic sound adjuster.

Figure 3:
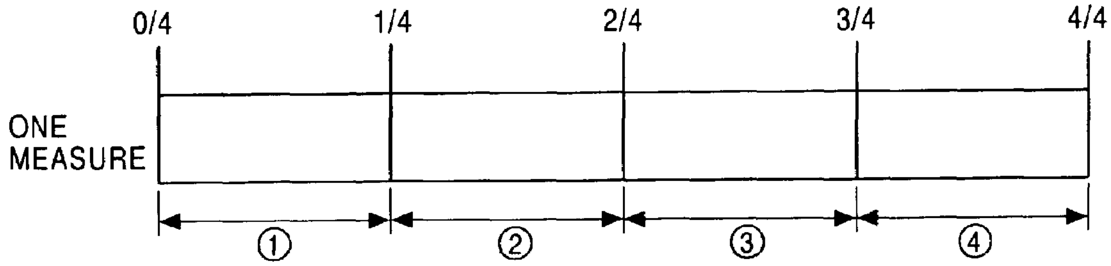
FIG. 3 is a diagram showing a manner in which timing adjustment is performed by an automatic sound adjuster, for a case in which a ¼ timing mode is specified.

FIG. 3 illustrates a manner of performing sounding timing adjustment by the automatic sound adjuster for a case in which a ¼ timing mode is specified. As shown in FIG. 3, each measure is divided into four periods, and if a key operation is performed within a period of (1), then a corresponding sound is generated at the end of a first ¼-period of one measure.

Similarly, when key operations are performed within periods of (2), (3), and (4), respectively, corresponding sounds are generated at the ends of second, third, and fourth ¼-periods of one measure, respectively.

The master volume controller is a functional module for adjusting the total sound volume of music. For example, the master volume controller may include a volume pointer (described later) that can be slid along a particular axis in accordance with the movement of the mouse (or a trackpad). The sound volume is set to a value corresponding to the position of the volume pointer within a range from a minimum level to a maximum level.

The pattern player is a functional module for generating a sound corresponding to a specified sound pattern, that is, a sound element registered as a pattern chip, in response to pressing of a key.

In the present embodiment, sound patterns are assigned to ten keys of "Z", "X", "C", "V", "B", "N", "M", "<", ">", and "?", respectively, in the front row of the QWERTY-type keyboard 112. These ten keys assigned the sound patterns are also called "sound keys". In the present invention, a set of assignments of sound patterns used in playing music to keys is called a "pattern pack". In the present embodiment, up to eight pattern packs can be registered (as will be described later). In the present embodiment, the toggling mode is activated/inactivated for each key assigned a sound pattern (as will be described later).

When a pattern key is maintained in a pressed state, a sound pattern assigned to that key is continuously played back in a manner similar to a manner in which a loop pattern is played back. If the pattern key is released from the pressed state, the playing back of the sound pattern is stopped. If the same key is pressed again, the same sound pattered is played back from its beginning.

In contrast, when the toggle mode (described later) is active, once a pattern key is pressed, a corresponding sound pattern is played back continuously. If the same pattern key is pressed again (or if the toggle mode is inactivated), the continuous playing back is stopped. By simultaneously pressing a plurality of pattern keys or by pressing one or more pattern keys in the toggle mode, it is possible to simultaneously play back a plurality of sound patterns in a superimposed fashion.

The pattern player has a "pattern stopper" for stopping a playback operation being performed by the pattern player. More specifically, for example, a "Back Space" key of the keyboard 112 is assigned to the pattern stopper. When a plurality of sound patterns are being simultaneously played back (in a superimposed fashion) by means of pressing a plurality of keys and/or using the toggle mode, if the pattern stopper is activated, the sound patterns are all stopped at the same time.

The one-shot player is a functional module for generating a sound element registered as a "one-shot sound" such as a percussion or a chant in a one-shot fashion (that is, for a very short period of time without continuing it).

In the present embodiment, one-shot sound elements are assigned to ten keys of "A" "S", "D", "F", "G", "H", "J", "K", "L", and "+" in the second row of the QWERTY-type keyboard 112. These ten keys assigned the one-shot sounds are also called "one-shot keys". In the present invention, a set of assignments of one-shot patterns used in playing music to keys is called a "one-shot pack". In the present embodiment, up to eight one-shot packs can be registered (as will be described later).

For the one-shot patterns, unlike the sound patterns described earlier, the toggle mode is not available. That is, when a one-shot key is pressed, a corresponding one-shot pattern is completely played back once without being continued. When a one-shot pattern is being played in response to pressing a one-shot key, if the same key is pressed again, the current playback operation is canceled, and a next playback operation for the same one-shot pattern is started.

In the present embodiment, playing of one-shot patterns can be controlled by pressing a corresponding key in cooperation with the mouse (or the trackpad). More specifically, if dragging is performed using the mouse (or if the trackpad is rubbed) while maintaining a key in a pressed state, a playback operation is controlled depending on the manner of dragging. In the present description, this capability is called "digital scratching". Examples of playback commands available in the digital scratching are described below.

(1) If the mouse is moved in an [X−, Y+] direction after pressing a one-shot key, or if the moving direction is switched from [X+, Y−] to [X−, Y+], a corresponding one-shot pattern is played back from its beginning.

(2) If the mouse is moved in the [X+, Y−] direction after pressing a one-shot key, or if the moving direction is switched from [X−, Y+] to [X+, Y−], a corresponding one-shot pattern is played back from its beginning.

(3) In the playback control (1) or (2) described above, the playback speed is varied in accordance with the moving speed of the mouse.

Herein, the XY coordinate system is defined such that the current position of the mouse pointer (at a time at which digital scratching is started) is employed as the origin. The changes in the pointer position in the X direction (horizontal direction) and in the Y direction (vertical direction) are determined with respect to a position where the mouse pointer was located n frames before. The changes per unit time are then calculated, and a parameter is changed by a corresponding amount.

Playback by means of the digital scratching using the mouse or the trackpad is stopped when a one-shot key is released from a pressed state. The playback by means of the digital scratching may be stopped, when the trackpad is tapped while maintaining a one-shot key in a pressed state. In this case, the same one-shot pattern may be restarted, when the trackpad is tapped again while maintaining the one-shot key in the pressed state.

In a period in which a one-shot key corresponding to a one-shot pattern is in a pressed state and the digital scratching is active, inputting of any other one-shot key is not accepted, and inputting of any effect pattern key does not cause a swing box (that will be described later) to appear.

The effector is a functional module for applying an effect (a sound effect) registered as an effect chip to the entire performance played by the sound player.

In the present embodiment, sound effects are assigned to ten keys of "Q" "W", "E", "R", "T", "Y", "U", "I", "O", and "P" in the third row of the QWERTY-type keyboard 112. These ten keys assigned the sound effect patterns are also called "effect keys". In the present description, a set of assignments of effects used in music performance to effects keys is called an "effect pack". In the present embodiment, up to eight effect packs can be registered (as will be described later). A combination of a pattern pack, a one-shot pack, and an effect pack is called a "sound pack". In the present embodiment, when the audio content processing software is started, a user specifies a sound pack to be used (refer to FIG. 2).

When an effect key is maintained in a pressed state, the swing box (which will be described later) is displayed on the screen, and the swing box disappears when the effect key is released.

In a period during which the swing box is displayed on the screen, a parameter (effect point) of an effect corresponding to a key in a pressed state is changed (that is, an effect balance can be changed) in accordance with a coordinate specified using the mouse or the trackpad. The change in the parameter is reflected in real time in music being played. In a period during which the swing box is displayed, the digital scratching described earlier is disabled, and thus digital scratching cannot be activated even if a one-shot key is operated.

Only one effect can be applied to music being played. This means that when an effect key is in a pressed state, inputting of any other effect key is not accepted.

For the effects, the toggle mode is also available, as with the sound patterns. That is, an effect key is pressed when the toggle mode is active, an effect assigned to the pressed effect key is continuously applied to music being played. When an effect is being applied in the toggle mode, if another effect key is pressed, the current effect is cancelled and an effect corresponding to the newly pressed effect key is applied.

In a case in which the same effect key as that which is currently applied is pressed again (that is, the same effect key is pressed successively), the current effect is cancelled. In this case, if the swing box is operated while maintaining the effect key in the pressed state, the application of the corresponding effect is maintained, and the effect point thereof can be changed. In other words, the application of the effect is continued even if the corresponding effect key is released.

Figure 4:
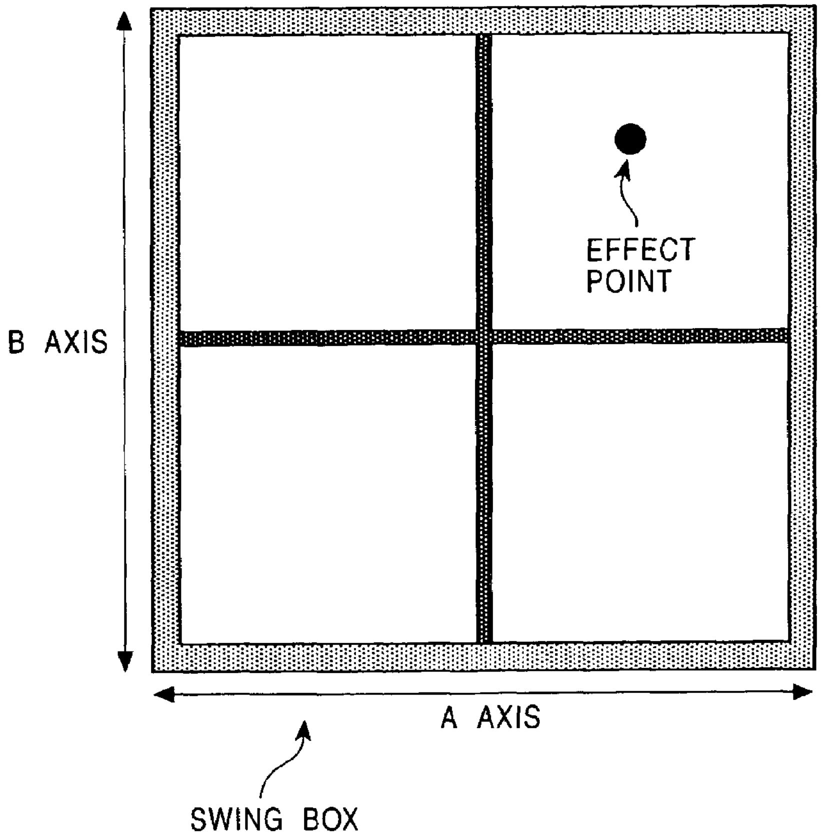
FIG. 4 is a diagram showing an example of a swing box used with an effector.

FIG. 4 shows an example of the swing box used to change the effect point. As shown in FIG. 4, a two-dimensional operating coordinate system including an A axis and a B axis is defined in the swing box, and balance factors are assigned to the A and B axes, respectively, when an effective chip is created (as will be described later). The length of each axis corresponds to an allowable range of a balance factor, such as a range from "min" to "max", from "dry" to "wet", or from "cut" to "boost".

A current effect point is displayed at a location corresponding to operating coordinates in the swing box. If the mouse or the trackpad is moved to specify coordinates, the effect point is moved in the swing box in response to the movement of the mouse or the trackpad, and the effect balances applied to music being played are changed in real time.

Figure 5:
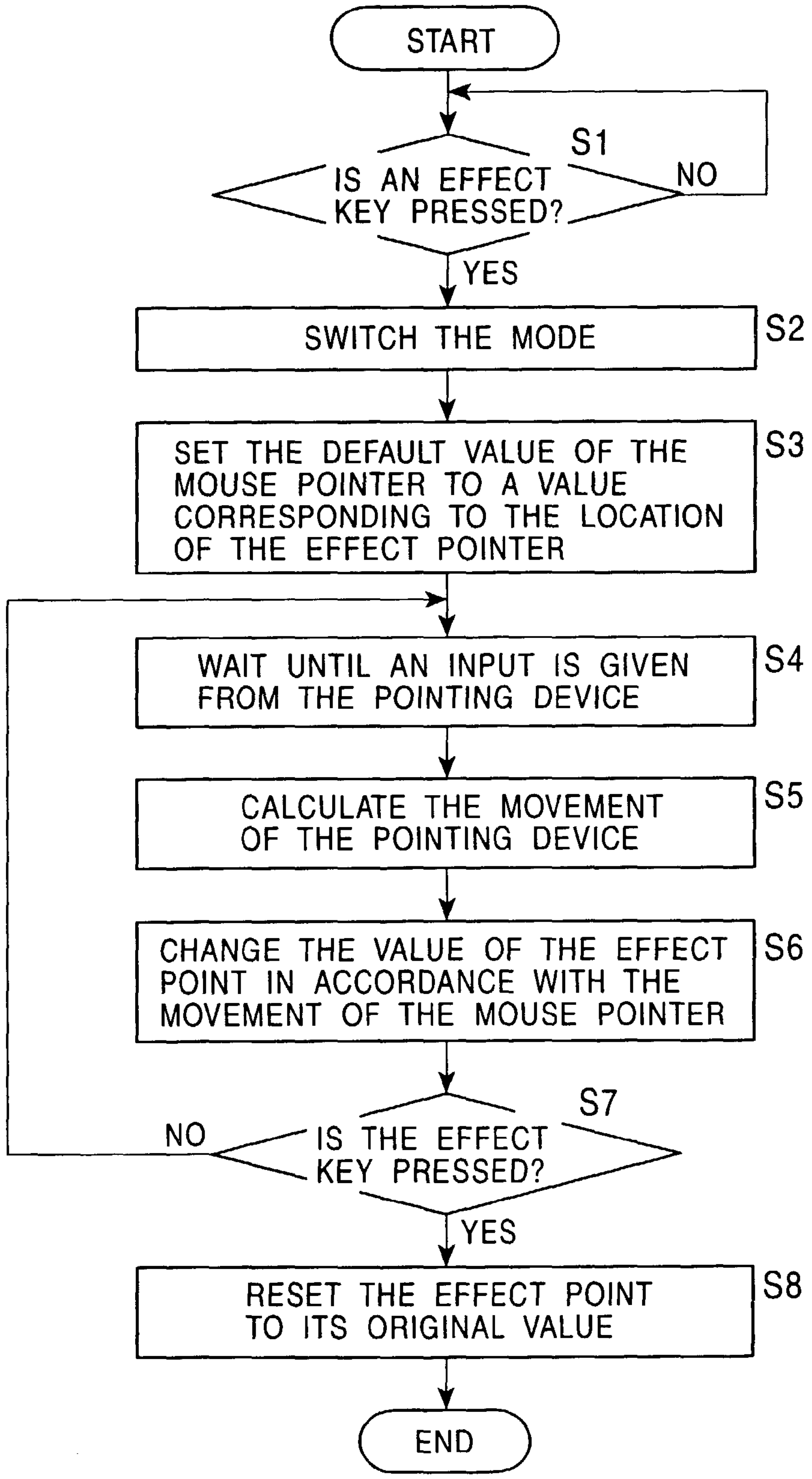
FIG. 5 is a flow chart showing a process performed by the effector using the swing box.

FIG. 5 is a flow chart showing a process performed by the effector using the swing box. The swing box is operated by a combination of an effect key assigned to a key of the keyboard 112 and the mouse or the trackpad.

If one effect key assigned to a certain key of the keyboard 112 is pressed (step S1), the operation mode of the effector is switched (step S2), and the swing box appears (FIG. 4) on the screen.

An effect point corresponding to current values of effect parameters is displayed in the swing box (as described earlier). On the other hand, the pointer of the coordinate pointing device such as the mouse or the trackpad points to a default effect point in the operating coordinate system of the swing box (S3).

If coordinates are specified using the coordinate pointing device such as the mouse or the trackpad (in step S4), the movement of the coordinate pointing device is calculated (step S5). The values of the effect parameters are determined on the basis of the calculated movement, and the effect point is moved in the swing box to a position corresponding to the values of the effect parameters determined (step S6).

Thereafter, if the effect key is released from the pressed state (step S7), the effect point is returned to its original position (step S8), and the mode is returned to the original mode. Thus, the present routine is ended.

In step S8, instead of returning the effect point its original position, the current position of the effect point in the swing box may be maintained.

The pack changer is a functional module for switching the sound pack, the one-shot pack, and the effect pack among those registered in respective performance layers of the sound patterns, the one-shot patterns, and the effects.

To make it possible to operate the pack changer via the keyboard 112, for example, an up arrow key "↑" and a down arrow key "↓" are assigned to keys for selecting performance layers, and a left arrow key "←" and a right arrow key "→" are assigned to keys for selecting packs. If an "Enter" key is pressed, selections become effective.

In a case in which the pack changer is operated using a rotation-type input device such as a jog dial, input items, such as "Select an upper layer"→"Determine a layer"→ "Select a pack type in a lower layer or return to an upper layer"→ . . . → "Determine the pack type and reflect the pack in performance", are assigned to respective rotational positions.

In the pack changer, changing of a sound pack, that is, re-assigning of sound patterns to pattern keys, is always acceptable regardless of whether music is being played or not. This allows a user to change a sound pattern at any time he/she wants.

When a sound pattern or an effect pack is changed in the middle of music performance using the sound player, if some sound key or effect key is maintained in a pressed state before changing the sound pattern or the effect pack, or if some sound key or effect key is in a toggled-on state, execution of the corresponding sound pattern or effect is continued without being cancelled. The pattern assignment associated with the key maintained in the pressed state is changed to that defined in the new pack when the key is cancelled (that is, when the is released from the pressed state or the key is toggled-off).

Video Player

The video player is a functional module for mainly dealing with an image. When music is being played by the sound player, the video player can display an image depending on music being played or in response to a change in tone of the music.

In the present embodiment, the video player is not directly operated, but the video player changes an image pattern such as a still image or a motion image in response to an inputting operation on a sound key during performance of music. The video player may also display a flash animation in a superimposed fashion in response to an operation of a one-shot key or an effect key.

System

The system is a functional module that allows a user to make various kinds of settings or customization associated with the playing operation performed by the sound player. The system includes a "recorder", a "score editor", a sound part browser", a "file transport", and a "sound pack editor".

The recorder is a functional module for recording music played by a user into a sequence file in a predetermined format.

The recorder can be set into a standby state (before starting playing music) or can be stopped (after the end of playing of music) by using a coordinate pointing device such as the mouse or the trackpad.

If recording of music using the recorder is started, a rhythm is provided so as to allow a user to start playing music at a correct time. If the user starts playing music, the rhythm is stopped (note that the rhythm is not recorded).

If the recording of the music is completed, silent parts before and after the performance of the music are automatically deleted, and silent parts with lengths of periods specified in the recording setting process are added at the beginning and the end of the recorded performance. Thus, complete record data is obtained.

The score editor is a functional module for editing sequence data recorded by the recorder. Herein, the term "edit" refers to arranging of timings of key operations performed in the performance of music. In the present description, input information associated with a series of key operations performed during performance of music is called a "band", and a set of bands is called a "score". Thus, editing involves dealing with a score.

Editing is performed on a sound pattern playing layer, a one-shot playing layer, and an effect playing layer. Various operations which can be and cannot be performed using the score editor are listed below.

(1) Sound Pattern Layer 1-1) The starting point and the ending point of performance can be shifted.

1-2) However, the shifting of the starting or ending point should be performed such that no overlap with a previous or following band occurs.

1-3) Performance information which does not exist in sequence data cannot be added.

1-4) Any band cannot be entirely removed.

1-5) Any band cannot be separated into a plurality of parts.

(2) One-Shot Layer 2-1) The position of a band can be shifted.

2-2) However, the position of a band cannot be shifted so as to overlap with a previous or following band.

2-3) Performance information which does not exist in sequence data cannot be added.

2-4) Any band cannot be entirely removed.

2-5) Any band cannot be separated into a plurality of parts.

(3) Effect Layer 3-1) The starting point and the ending point of performance can be shifted.

3-2) However, the shifting of the starting or ending point should be performed such that no overlap with a previous or following band occurs.

3-3) Performance information which does not exist in sequence data cannot be added.

3-4) Any band cannot be entirely removed.

3-5) Any band cannot be separated into a plurality of parts.

The sound part browser is a functional module for dealing with sound elements such as sound patterns, one-shot patterns, and effects and also for dealing with a sequence file recorded using the recorder. Functions provided by the sound part browser are listed below.

(1) Displaying various chips (sound patterns, one-shot patterns, effects) in the form of a list (2) Displaying records (sequence data) in the form of a list (3) Sorting chips or records displayed in a list (4) Rewriting management information of the chip list (5) Exchanging chips assigned to sound packs being currently used (changing assignment of chips to keys)

(6) Playing back a chip file or a sequence file (7) Stopping playing back of a chip file or a sequence file (8) Pausing playing back of a chip file (9) Exchanging a sequence file

(10) Producing and editing a chip list

(11) Modifying a chip list

(12) Referring to a chip list

(13) Adding a chip

(14) Removing a chip

The file transporter is a functional module for importing and exporting various files. Information about imported and exported files is managed using a chip list. The sound part browser (described later) is used as an operation interface for importing and exporting files.

The sound pack editor is a functional module for comprehensively managing sound packs in which sound packs, one-shot packs, and effect packs are registered for each performance layer.

A sound pack includes a set (pattern pack) of sound patterns assigned to specific keys used in playing music, a set (one-shot pack) of one-shot patterns assigned to specific keys used in playing music, and a set (effect pack) of effects assigned to specific keys used in playing music, Each sound pack includes sound patterns assigned to ten keys of "Z", "X", "C", "V", "B", "N", "M", "<", ">", and "?", respectively, in the front row of the QWERTY-type keyboard 112, and up to eight pattern packs can be registered.

Each one-shot pack include one-shot patterns assigned to ten keys of "A" "S", "D", "F", "G", "H", "J", "K", "L", and "+" in the second row of the QWERTY-type keyboard 112, and up to eight one-shot packs can be registered.

Each effect pack includes sound effects assigned to ten keys of "Q" "W", "E", "R", "T", "Y", "U", "I", "O", and "P" in the third row of the QWERTY-type keyboard 112, and up to eight effect packs can be registered.

Thus, each sound pack is a set of packs selected from those described above. The sound pack editor allows a user to give a name to a sound pack, and also to rename, add, and delete various types of packs. Furthermore, the sound pack editor also allows a user to specify and change a BPM, and register and change packs. An operation procedure of producing packs using the sound pack editor is described below.

(1) Production of a Pattern Pack 1-1) Up to ten sounds patterns are selected from a list displayed in the sound part browser, and the selected sound patterns are registered together as one set.

1-2) The toggle mode is activated or inactivated for each sound pattern.

1-3) The output volume is set for each sound pattern.

(2) Production of a One-Shot Pack 2-1) Up to ten one-shot patterns are selected from a list displayed in the sound part browser, and the selected one-shot patterns are registered together as one set.

2-2) The output volume is set for each one-shot pattern.

(3) Production of an effect pack 3-1) Up to ten effects are registered together as one set. The effects to be registered can be selected from those already registered in a chip list. If desired, an effect selected from the list can be customized.

3-2) The toggle mode is activated for inactivated for each effect.

Now, an operating screen of the audio content processing software according to the present embodiment is described below.

Figure 6:
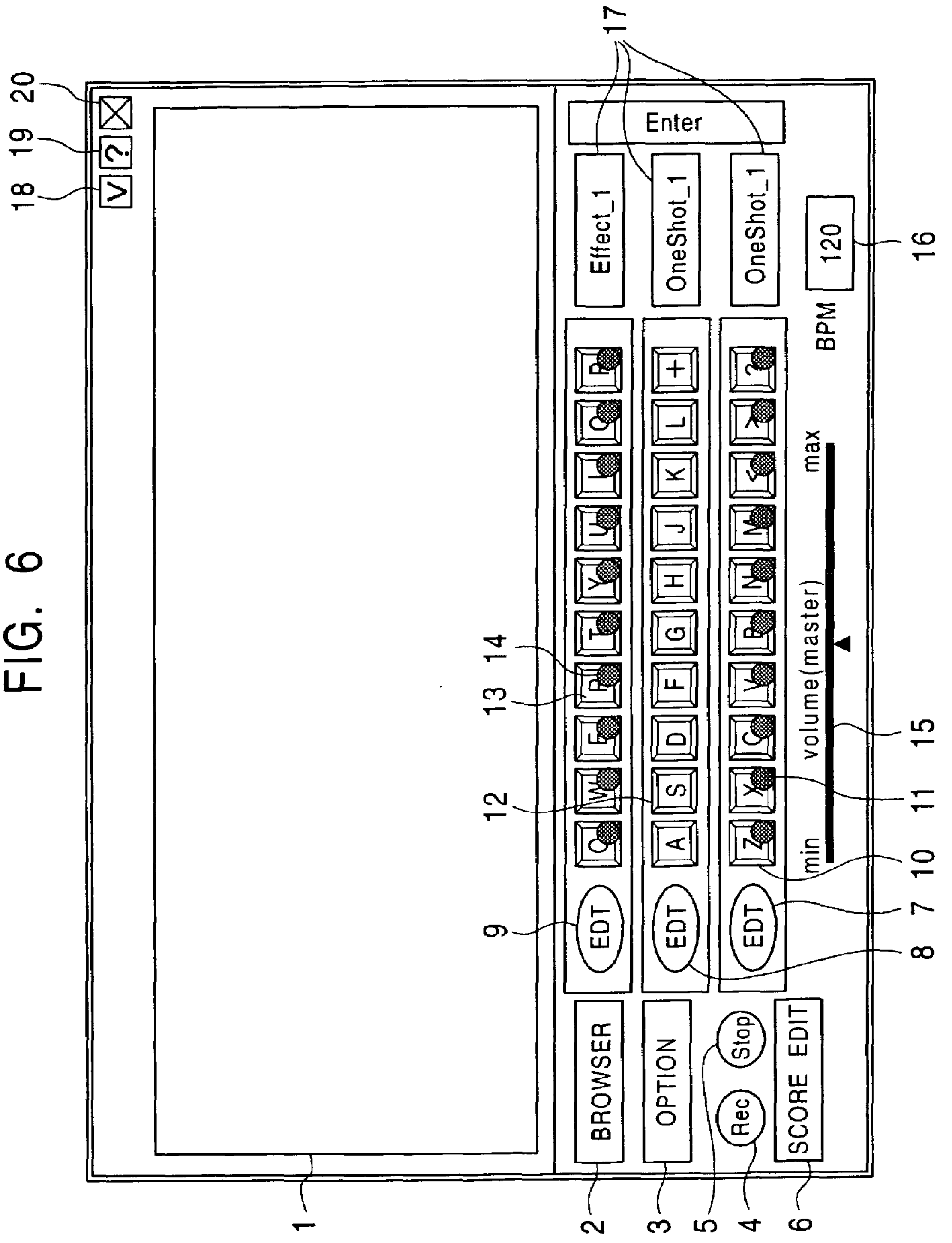
FIG. 6 is a diagram showing an example of a main screen which is displayed on a display when the audio content processing software according to the embodiment of the invention is started on the computer system.

FIG. 6 shows an example of a main screen which is first displayed on the screen of the display 111 when the audio content processing software according to the present embodiment is started on the computer system 100.

As shown in FIG. 6, the main screen includes a flash movie display area 1, a browser button 2 for opening the sound part browser, an option setting button 3 for opening an option setting window, a record start button 4, a record stop button 5, a score editor button 6 for opening the score editor, a pattern manager button 7 for calling a pattern manager, a one-shot manger button 8 for calling a one-shot manager, an effect manager button 9 for calling an effect manager, a pattern play button 10, a pattern toggle button 11, a one-shot play button 12, an effect play button 13, a master volume controller 15, a BPM input box 16, a real-time pack changer 17, a version button 18 for displaying version information, a help button 19 for opening a help window, and an exit button 20.

If the pattern play button 10, the one-shot play button 12, or the effect play button 13 is operated, a flash movie assigned to an operated button is displayed in the flash movie display area 1.

If the sound part browser button 2 is clicked 2, the sound part browser is activated. The sound part browser is a functional module for dealing with sound elements such as sound patterns, one-shot patterns, and effects and a sequence file recorded using the recorder. The screen of the sound part browser will be described in detail later.

If the option setting button 3 is clicked, the option setting window appears. The screen of the option setting window will be described in detail later.

Playing information specified via the main screen after clicking the record start button 4 is recorded as sequence data by the recorder (as will be described later).

If the record stop button 5 is clicked, the recording of the performance started by clicking the record start button 4 is terminated.

If the score editor button 6 is clicked, the score editor for editing the sequence data recorded by the recorder is activated, and the score editor window appears. The screen of the score editor window will be described in detail later.

If the pattern manager button 7 is pressed, the pack manger, which will be described later, is activated, and it becomes possible to edit and change a set of sound patterns assigned to sound keys. In the present embodiment, ten keys of “Z”, “X”, “C”, “V”, “B”, “N”, “M”, “<”, “>”, and “?” in the front row of the QWERTY-type keyboard 112 are assigned as sound keys.

If the one-shot manager button 8 is pressed, the pack manager, which will be described later, is activated, and it becomes possible to edit and change a set of one-shot patterns assigned to one-shot keys. In the present embodiment, ten keys of “A” “S”, “D”, “F”, “G”, “H”, “J”, “K”, “L”, and “+” in the second row of the QWERTY-type keyboard 112 are assigned as one-shot keys.

If the effect manager button 9 is pressed, the pack manager, which will be described later, is activated, and it becomes possible to edit and change a set of effects assigned to effect keys. In the present embodiment, ten keys of “Q” “W”, “E”, “R”, “T”, “Y”, “U”, “I”, “O”, and “P” in the third row of the QWERTY-type keyboard 112 are assigned as effect keys.

The pattern play buttons 10 include a total of ten keys of “Z”, “X”, “C”, “V”, “B”, “N”, “M”, “<”, “>”, and “?” assigned as the sound keys on the QWERTY-type keyboard 112.

Throughout a period in which a sound play button 10 is in a pressed state, a sound pattern assigned to the key is played repeatedly by the sound player (described earlier). If a plurality of sound keys are simultaneously pressed, a plurality of corresponding sound patterns are simultaneously played (that is, patterns are superimposed). However, because of limitation in hardware, the maximum number of effect keys the keyboard 112 can accept when they are simultaneously pressed is limited to 3.

A pattern toggle button 11 is disposed on each pattern play button 10. If the pattern toggle button 11 disposed on a desired pattern play button 10 is clicked, the toggle mode for the corresponding sound pattern is activated, and thus it becomes possible to continuously play the sound pattern.

When a sound pattern is being continuously played back in response to pressing a sound pattern key in the toggle mode, if the same key is pressed again, the playback of the sound pattern is stopped. If a current pattern pack is changed to a another pattern pack via the real-time pack changer 17 (described later) when a pattern play button 10 is in a pressed state or when a pattern play button 10 is in a toggled-on state, playing back of a sound pattern defined in an old pattern pack is continued, and pattern assignment defined in the new pattern pack becomes effective when the current sound generation is stopped.

The one-shot play buttons 12 include a total of ten keys of “A” “S”, “D”, “F”, “G”, “H”, “J”, “K”, “L”, and “+” assigned as one-shot keys on the QWERTY-type keyboard 112.

If a one-shot play button 12 is pressed, a one-shot sound such as a percussion or a chant assigned to the pressed button is generated. When a one-shot pattern is being played in response to pressing a certain one-shot key, if the same key is pressed again, the current playing operation of the one-shot pattern is canceled, and a next playing operation for the one-shot pattern is started in response to pressing the same key.

While maintaining a one-shot play button 12 in a pressed state, if the trackpad is rubbed (or the mouse is dragged), digital scratching is performed (as described earlier). That is, if the trackpad is rubbed in either the [X−, Y+] direction or [X+, Y−] direction, generation of a corresponding one-shot sound is restarted from its beginning. In this case, the sound generation speed varies depending on the rubbing speed. When the one-shot play button 12 is released, the generation of the one-shot sound is stopped. If the trackpad is tapped while maintaining a one-shot play button 12 in a pressed state, a corresponding one-shot pattern is played back again.

In a period in which a one-shot play button 12 is maintained in a pressed state (and thus digital scratching is active) inputting of any other one-shot key or one-shot play button is not accepted, and pressing any effect key does not cause the swing box (described earlier) to appear.

The effect play buttons 13 include a total of ten keys of "Q" "W", "E", "R", "T", "Y", "U", "I", "O", and "P" assigned as effect keys on the QWERTY-type keyboard 112.

Throughout a period in which an effect play button 13 is maintained in a pressed state, an effect (sound effect) assigned to the key in the pressed state is applied to all patterns being played in music. A plurality of effects cannot be activated at the same time, but only one effect can be active. If another effect is overlapped with a currently active effect, the current effect is cancelled, and the effect input later becomes active.

If any effect play button 13 is pressed, the swing box (described earlier) appears, and the swing box disappears when the button 13 is released. By operating the trackpad while maintaining an effect play button 13 or an effect key in a pressed state, it is possible to change its effect point (effect balance). The change in the effect point is reflected in real time in playing of music (as described earlier). The types of effects assigned to the swing box are selected using an effect file maker, which will be described later.

An effect toggle button 14 is disposed on each effect play button 13. If an effect toggle button 14 corresponding to a desired effect play button 13 is clicked, the toggling mode of a corresponding effect is activated, and it becomes possible to continuously apply the same effect to the performance of music.

When an effect is being continuously applied as a result of toggling-on an effect key, if the same key is pressed again (or released after being pressed), the effect is stopped. However, if the swing box is operated while maintaining the effect play button 13 or the effect key in the pressed state without releasing it, the effect is kept active.

In a period in which an effect play button 13 or an effect key is maintained in a pressed state (that is, when the swing box is active), digital scratching is disabled, and thus digital scratching is not performed even if an one-shot play button 12 or a one-shot key is operated.

If an effect pack is changed using the real-time pack changer 17 (described later) when an effect play button 13 or an effect key is maintained in a pressed state or when the same effect is continuously applied in a toggled-on state, the effect used before the effect pack has been changed is still used after the change of the effect pack, and the assignment associated with that effect key is switched to that defined in the new effect pack when the current sound generation is stopped.

The master volume controller 15 has a triangular-shaped volume pointer attached to a horizontal bar. The total sound volume can be adjusted by dragging the volume pointer using the coordinate pointing device such as the mouse.

The BPM input 16 is used to input a numerical value indicating BPM (Beats per Minute) to be applied in playing music, thereby specifying the tempo.

The real-time pack changer 17 includes an up arrow key "↑", a down arrow key "↓" a left arrow key "←", a right arrow key "→", and an "Enter" key or button on the keyboard 112. By pressing the up arrow key "↑" or the down arrow key "↓", it is possible to select a performance layer among those associated with sound patterns, one-shot patterns, and effects. By pressing the left arrow key "←" or the right arrow key "→", it is possible to select a pack (key assignment) in a selected performance layer. If the "Enter" key or button is pressed, a pack being currently displayed becomes effective.

If the version button 18 is clicked using the mouse, a dialog indicating the version of the audio content processing software is displayed.

If the help button 19 is clicked with the mouse, the help window (known in the art) is activated.

If the exit button 20 is clicked with the mouse, the application being currently active is ended.

Figure 7:
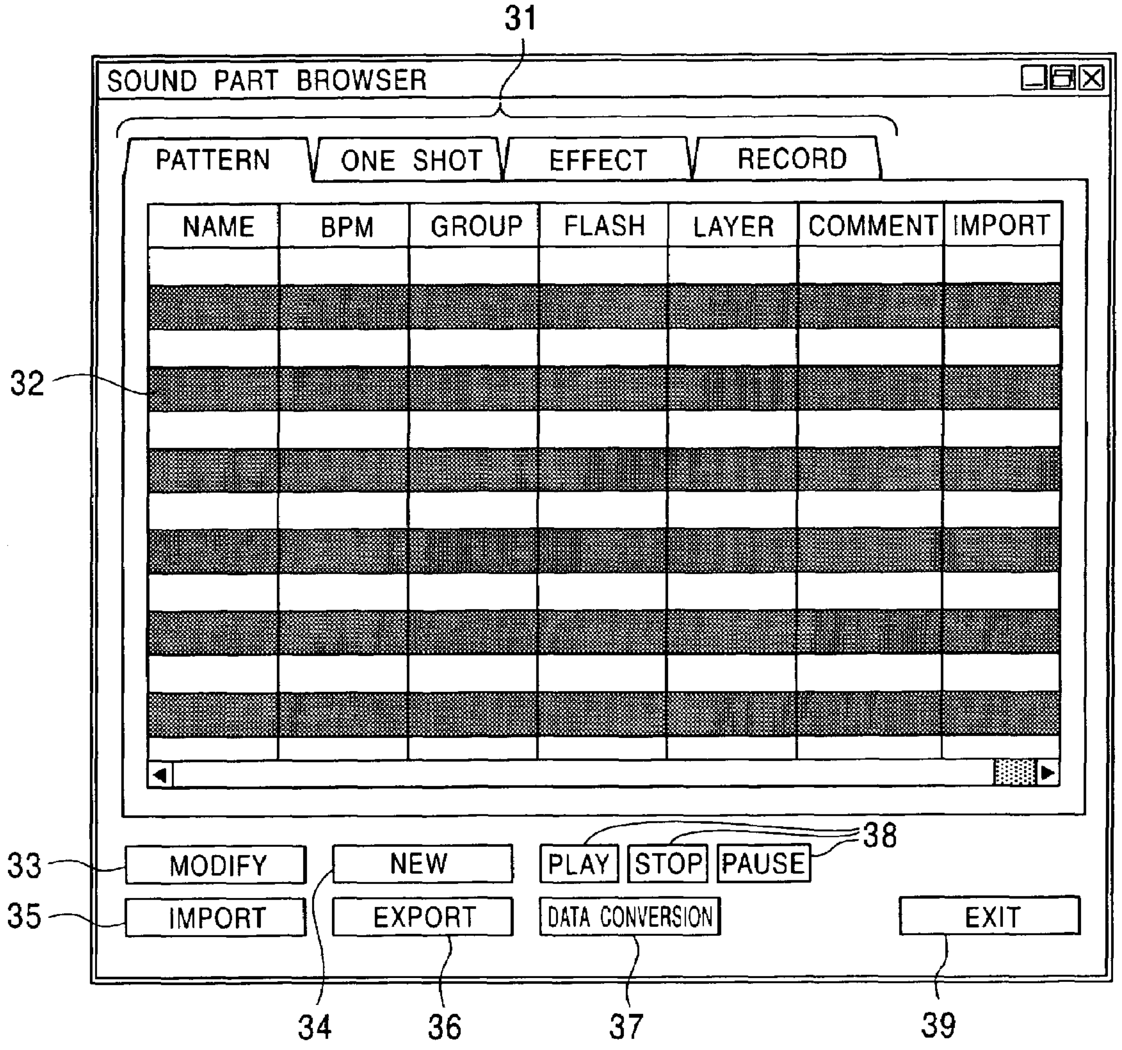
FIG. 7 is a diagram showing an example of a window screen of a sound part browser.

FIG. 7 shows an example of the window screen of the sound part browser. As described earlier, the sound part browser is activated when the sound part browser button 2 on the main screen shown in FIG. 6 is pressed.

The sound part browser is used to generally manage sound part information of sound patterns, one-shot patterns, effects, and records, used in performance of music. As shown in FIG. 7, the sound part browser has information display areas 32 for displaying information associated with the respective performance layers of sound patterns, one-shot patterns, effects, and records. If a tab 31 is clicked, a corresponding information display area 32 appears. In the specific example shown in FIG. 7, a sound pattern tab 31 is selected, and an information display area 32 for sound patterns is displayed on the screen. The window screen of the sound part browser shown in FIG. 7 includes a chip information modification button 33, a new chip production button 34, a chip/record import button 35, a chip/record export button 36, a WAV conversion button 37 for converting record data into a WAV format, a chip/record player 38, and a browser exit button 39.

The sound pattern information display area 32 includes fields for describing information of each registered sound pattern in terms of a name, a group, a BPM value, a flash file name, a flash layer, a comment, and an import date/time of a data file.

A one-shot information display area (not shown) includes fields for describing information of each registered one-shot pattern in terms of a name, a group, a flash file name, a flash layer, a comment, and an import date/time of a data file.

An effect information display area (not shown) includes fields for describing information of each registered effect in terms of a name, a group, a flash file name, a flash layer, a comment, and an import date/time of a data file.

A record information display area (not shown) includes fields for describing information of each record in terms of a name, a BPM value, a comment, and a data production date/time.

If the chip information modification button 33 is clicked, a chip information window, which will be described later, is activated, and it becomes possible to modify information about a chip being currently selected in the information display area (the selected chip is highlighted or reversed).

If the new chip production button 34 is clicked, a chip information window, which will be described later, is activated, and it becomes possible to input information about a new chip.

If the chip/record import button 35 is clicked, an import window, which will be described later, is activated, and it becomes possible to import a chip or a record from the outside of the system.

If the chip/record export button 36 is clicked, an export window (not shown) is activated, and it becomes possible to export a registered chip or record to the outside of the system.

As for the export window, for example, a file saving window available as one of functions in the "Windows" operating system (OS) of Microsoft Corp. of USA can be employed. To export files, a user inputs a folder name into the file saving window and copies files to be exported into the folder. Exporting of a record is performed for one piece of music at a time (a plurality of records cannot be exported at the same time).

By pressing the WAV conversion button 37, it is possible to convert record data (sequence data recorded by the recorder) selected in a currently active information display area 32 into the WAV format.

The chip/record player 38 has a Play button, a Stop button, a Pause button, etc., used in a playing operation. In response to pressing such a button, record data (sequence data recorded by the recorder) selected in the information display area 32 is played, stopped, or paused.

If the browser exit button 39 is pressed, the sound part browser is closed.

Figure 8:
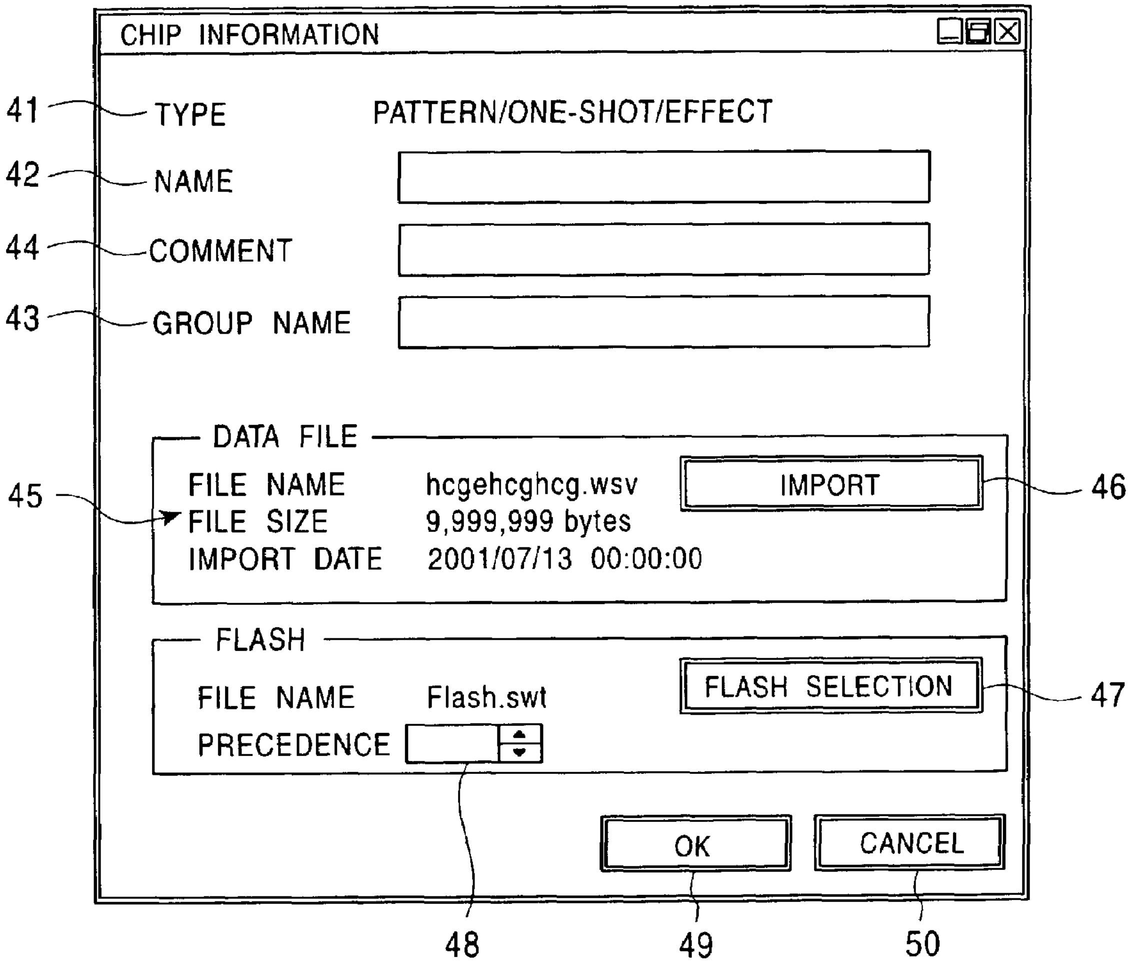
FIG. 8 is a diagram showing an example of a chip information window screen.

FIG. 8 shows an example of the screen of the chip information window. The chip information window is used to deal with sound chip information in respective performance layers of sound patterns, one-shot patterns, and effects. As shown in FIG. 8, the chip information window includes a type information display field 41, a name information field 42, a group information field 43, a comment information field 44, a WAV data information field 45, a flash selection button 47, a precedence field 48, an OK button 49, and a cancel button 50.

In the type information field 41, information, indicating whether the chip is of a sound pattern, a one-shot pattern, or an effect, is displayed.

In the name information field 42, a chip name of the chip being currently selected is displayed.

The name can be changed using this field.

In the group name information field 43, the name of the group the chip being currently selected belongs to is displayed. The group name can be changed using this field.

In the comment information field 44, a comment about the chip being currently selected is displayed. The comment can be input or changed using this field.

In the WAV data information field 45, information about a data file of the selected chip is displayed. If an import button 46 in this field 45 is pressed, a sound chip file is imported or an effect chip is produced. In a case in which a new chip has been produced using the sound part browser (described earlier), a WAV file is imported and the effect file maker (described later) is activated.

If the flash selection button 47 is pressed, a flash movie selection window, which will be described later, is activated, and it becomes possible to select a flash movie to be assigned to a chip. A flash movie selected herein is displayed in the flash movie display area 1 of the main screen during a period in which a corresponding chip is being played.

The precedence field 48 is used to specify the precedence of displaying a flash movie assigned to a chip. If the play buttons 10, 12, and 13 of sound patterns, one-shot patterns, and effects are pressed, corresponding flash movies are immediately displayed in a superimposed fashion in the flash movie display area 1 (described earlier) of the main screen in response to pressing buttons. Herein, the precedence indicates the order of superimposing the flash movies.

If the OK button 49 is pressed, the chip information input via the chip information window becomes effective, and the window is closed.

If the cancel button 50 is pressed, the chip information input via the chip information window is cancelled, and the window is closed.

Figure 9:
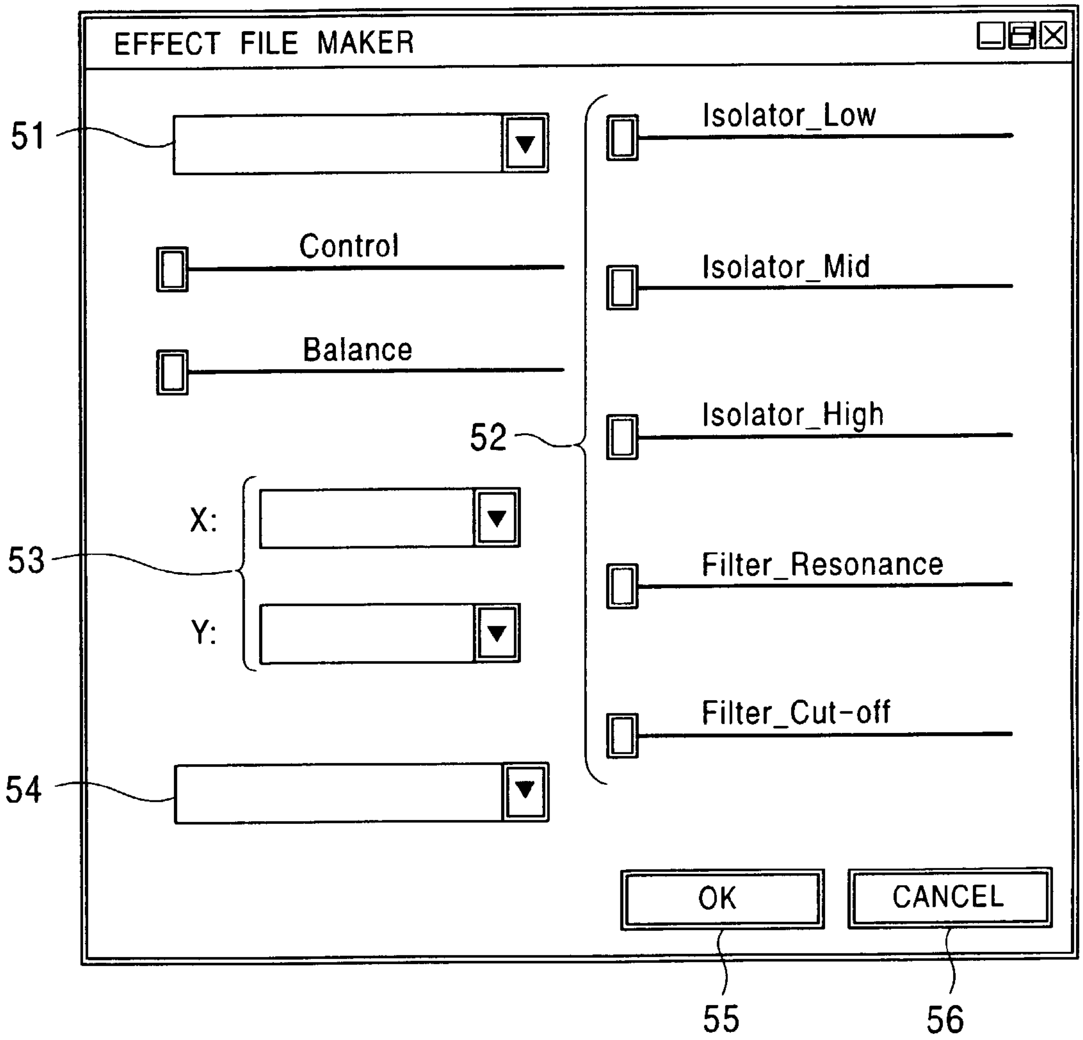
FIG. 9 is a diagram showing an example of a screen of an effect file maker window.

FIG. 9 shows an example of the screen of the effect file maker window. The effect file maker window is used to produce effect information used by the sound player during music performance. As shown in FIG. 9, the effect file maker window includes a basic tone effect field 51, an effect balance 52, X and Y input fields 53, a test BGM field 54, an OK button 55, and a cancel button 56.

The basic tone effect field 51 is a field in the form of a combo box for selecting a basic tone effect from those which are displayed in a list box (not shown) in response to pressing a button of. The selectable basic tone effects include "Distortion", "Autopan", "RingMod", "Flanger", "Phaser", "Slice", "Delay", "Echo", "Lo-Fi", "Wah", and "Plane".

The effect balance 52 is set by dragging, using the mouse or the like, a pointer on a slider assigned for each element of an effect. Elements of each effect include "Control", "Balance", "Isolator_Low", "Isolater_Mid", "Isolater-High", "Filter-Resonance", and "Filter-Cut-off".

The X and Y fields 53 are used to select elements of the real-time effector, which are to be adjusted in real time during performance of music. Each of the X and Y fields 53 is a field in the form of a combo box, which allows a user to select an element from an element set consisting of "Control", "Balance", "Isolator_Low", "Isolater_Mid", "Isolater-High", "Filter-Resonance", and "Filter-Cut-off". Effect elements set in the X and Y fields are respectively assigned to the A and B axes of the swing box (described earlier with reference to FIG. 4) so that the values thereof can be varied in real time in response to a dragging operation on the trackpad or the mouse during performance of music.

The test BGM field 54 is a field in the form of a combo box, for inputting text data or making a selection from a list displayed in a list box (not shown) to specify a music file to be automatically played when the effect file maker window is activated. A user can adjust the effect balance by testing it on a music file selected as the music file played at the start of the effect file maker window.

If the OK button 55 is pressed, effect information input via the effect file maker window becomes effective, and the effect file maker window is closed.

If the cancel button 56 is pressed, effect information input via the effect file maker window is cancelled, and the effect file maker window is closed.

Figure 10:
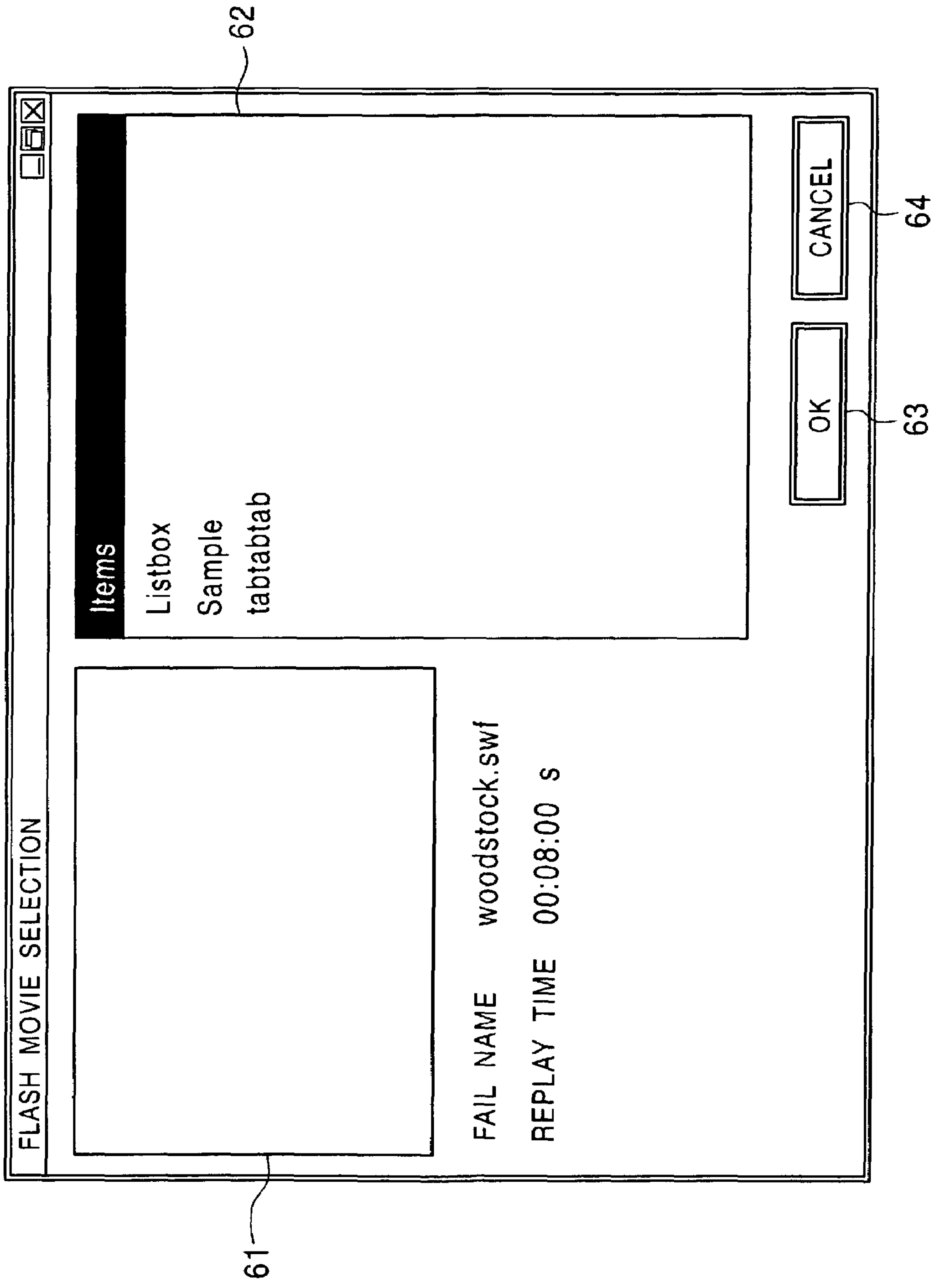
FIG. 10 is a diagram showing an example of a screen of a flash movie selection window.

FIG. 10 shows an example of the screen of the flash movie selection window. The flash movie selection window can be called from either the chip information window or the option window which will be described later. As shown in FIG. 10, the flash movie selection window includes a flash movie viewer 61, a flash movie list 62, an OK button 63, and a cancel button 64.

In a case in which the flash movie selection window is called from the chip information window, the flash movie selection window acts as a movie selector for relating chips in respective performance layers of sound patterns, one-shot patterns, and effects to flash movies. By using this movie selector, it is possible to select a visual effect movie to be displayed in the flash display area 1 during performance of music.

On the other hand, in a case in which the flash movie selection window is called from the option window, the flash movie selection window can be used to select a background movie to be played in the flash display area 1 during performance of music.

The flash movie viewer 61 is an area in which a selected flash movie is displayed.

The flash movie list 62 is an area in which selectable flash movies are displayed in the form of a list, wherein a movie being currently selected is displayed in a reversed fashion.

If the OK button 63 is pressed, flash movies selected via the flash movie selection window are related to chips, and the flash movie selection window is closed.

If the cancel button 64 is pressed, flash movies selected via the flash movie selection window are cancelled, and the flash movie selection window is closed.

Figure 11:
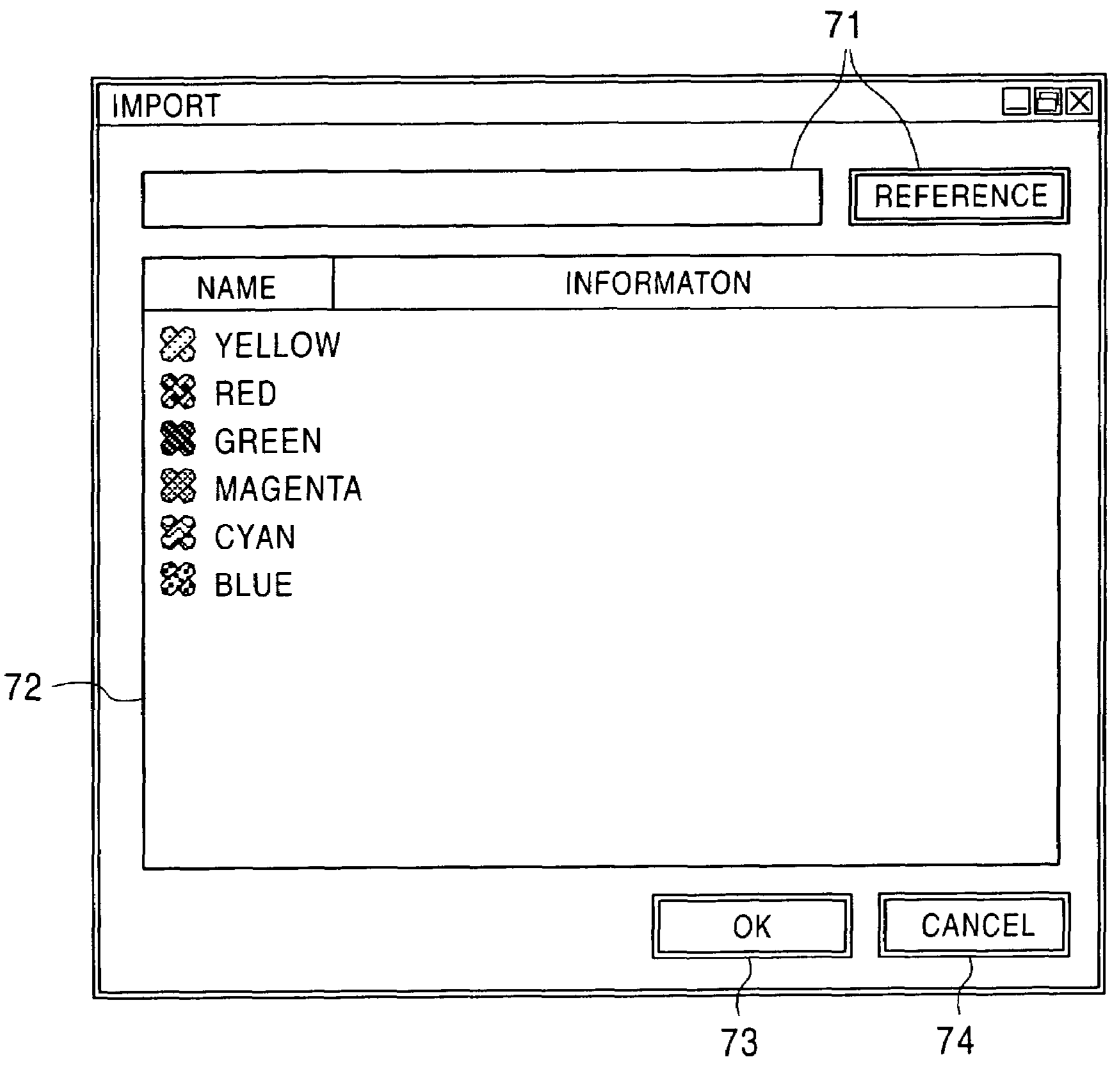
FIG. 11 is a diagram showing an example of an import window screen.

FIG. 11 shows an example of the screen of the import window. The import window is used to import various files to be used as chips (sound chips) in performance from the outside of the system. As shown in FIG. 11, the import window includes a folder designating field 71, a file information field 72, an OK button 73, and a cancel button 74.

The folder designating field 71 is used to designate a folder in which files to be imported are stored.

In the file information field 72, information indicating files stored in the folder designated by the folder designating field 71 is displayed in the form of a list.

If the OK button 73 is pressed, selected files in the folder are imported, and the import window is closed.

If the cancel button 74 is pressed, the import window is closed without importing selected files in the folder.

Figure 12:
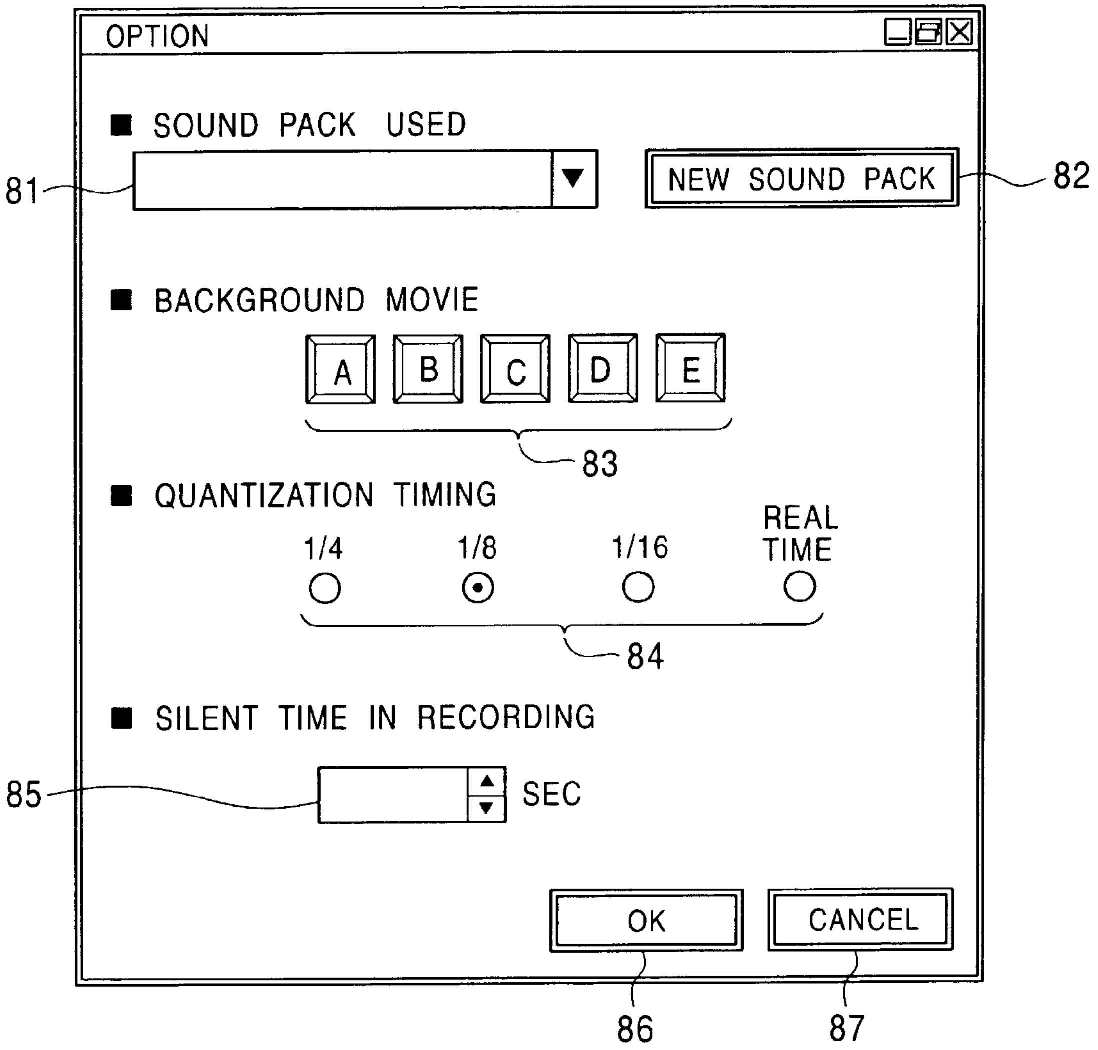
FIG. 12 is a diagram showing an example of an option window screen.

FIG. 12 shows an example of the screen of the option window. This option window shown in FIG. 12 is used to change various settings. As shown in FIG. 12, the option window includes a sound pack selection field 81, a new sound pack production button 82, a background movie selection field 83, a quantization timing designating field 84, a silent recording time designating field 85, an OK button 86, and a cancel button 87.

The sound pack selection field 81 is a field in the form of a combo box, which allows a user to input text data indicating a sound pack to be used in performance or to select a sound pack from a list displayed in a list box (not shown).

Each sound pack includes (as described earlier) a set (pattern pack) of sound patterns assigned to specific keys used in performance, a set (one-shot pack) of one-shot patterns assigned to specific keys used in performance, and a set (effect pack) of effects assigned to specific keys used in performance. That is, each sound pack includes information about key assignment of a set of such sound chips, and each sound pack is stored separately in an individual file.

In the present embodiment, up to eight pattern packs, up to eight one-shot pack, and up to eight effect packs can be registered, and thus up to 512 (=8×8×8) sound packs can be produced.

By pressing the new sound pack production button 82, it is possible to produce a sound pack.

The background movie selection field 83 includes five buttons A to E, which are respectively assigned background movies. If one of buttons A to E is pressed during performance of music, a background movie played back in the flash display area 1 is selected.

The quantization timing designating field 84 is used to designate timing adjustment of performance. In the specific example shown in FIG. 12, the quantization timing designating field 84 includes four radio buttons, which allow a user to selectively specify ¼, ⅛, or 1/16 as the timing. If a real-time radio button is selected, no timing adjustment is performed.

If the OK button 86 is pressed, information selected via this option window becomes effective, and the option window is closed.

If the cancel button 87 is pressed, information selected via this option window is cancelled, and the option window is closed.

Figure 13:
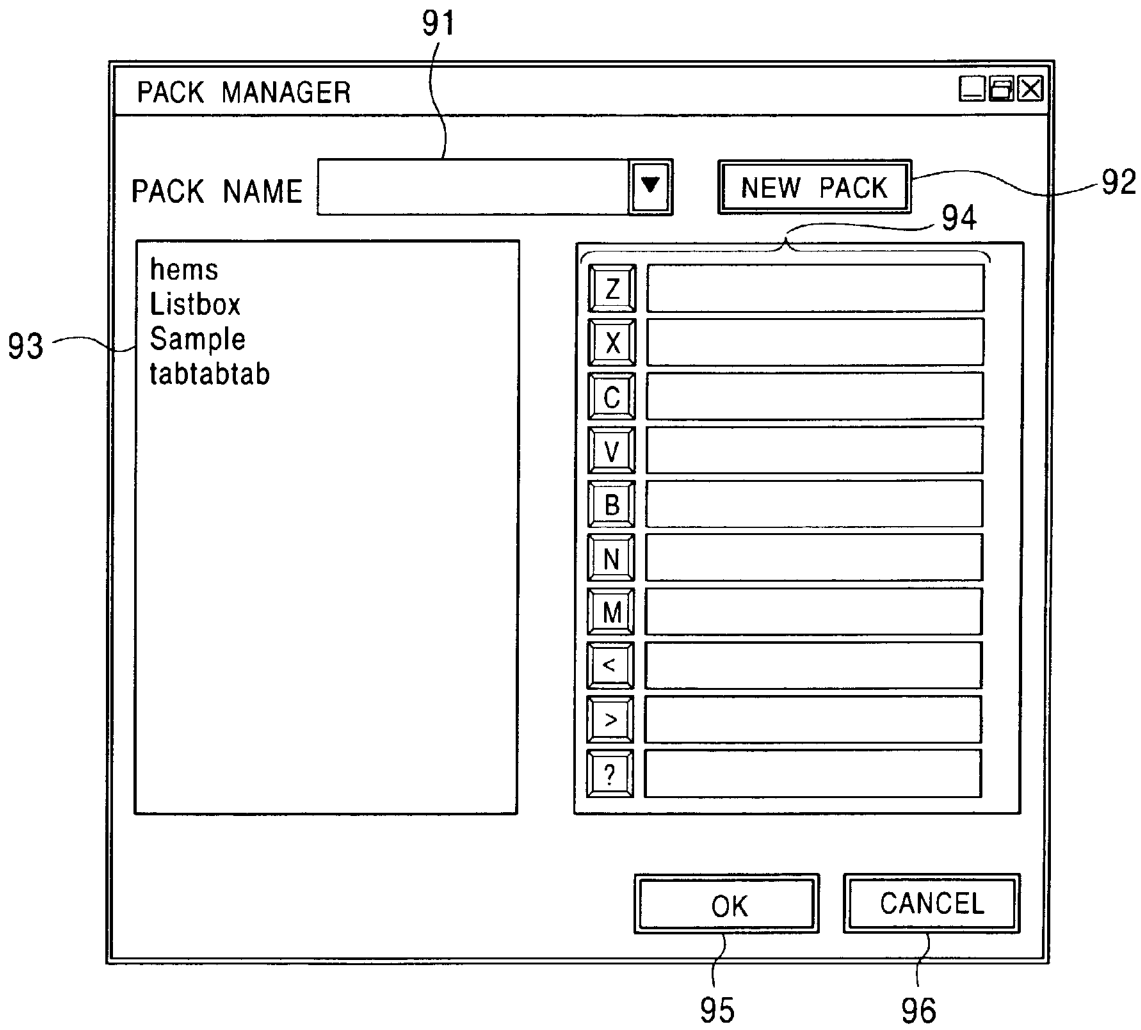
FIG. 13 is a diagram showing an example of a pack manager window screen.

FIG. 13 shows an example of the screen of the pack manager window. The pack manager window is used to edit a sound pack, a one-shot pack, or an effect pack.

In a case in which the pattern manager button 7 of the main screen is pressed, a pattern manager window appears which has a screen with a form adapted to editing and changing a sound pack, that is, adapted to assigning sound patterns to respective sound keys.

In a case in which the one-shot manager button 8 on the main screen is pressed, a pattern manager window appears which has a screen with a form adapted to editing and changing a one-shot pack, that is, adapted to assigning one-shot patterns to respective one-shot keys.

On the other hand, if the effect manager button 9 on the main screen is pressed, a pattern manager window appears which has a screen with a form adapted to editing and changing an effect pack, that is, adapted to assigning effects keys to respective effect keys.

In the example shown in FIG. 13, the pattern manager window has a screen with a form adapted to editing and changing a sound pack in which assignment of a set of sound patterns to respective sound keys is defined. In the example shown in FIG. 13, the pattern manner window includes a pack selection field 91, a new pack creation button 92, a chip list display field 93, an assignment information field 94, an OK button 95, and a cancel button 96.

The pack selection field 91 is a field in the form of a combo box, which allows a user to select a name of a pattern pack (or one-shot pack or an effect pack) to be subjected to key assignment.

If the new pack production button 92 is pressed, a pattern pack (or a one-shot pack or an effect pack) is newly produced. In the above operation, a name of a pattern pack can also be specified by directly inputting characters indicating the name. In each performance layer, up to eight pattern packs, up to eight one-shot packs, and up to eight effect packs can be added.

In the chip list field 93, chips (sound chips) selectable for respective performance layers are displayed in the form of a list.

In the assignment information field 94, names of chips (sound chips) assigned to respective keys are displayed. Keys displayed in this field are switched in accordance with a pack used in a performance layer being dealt with. In the example shown in FIG. 13, in order to allow a user to assign sound patterns to keys, a total of ten pattern keys assigned, as sound keys, to “Z”, “X”, “C”, “V”, “B”, “N”, “M”, “<”, “>”, and “?” in the front row of the QWERTY-type keyboard 112 are displayed. Key assignment can be changed by directly inputting text data indicating a chip name into an assignment information field 94 of a corresponding key, or by dragging and dropping a desired chip from a chip list into an assignment information field of a corresponding key.

If the OK button 95 is pressed, assignment information set in the pattern manager window becomes effective, and the pattern manager window is closed.

If the cancel button 96 is pressed, assignment information set in the pattern manager window is cancelled, and the pattern manager window is closed.

Finally, a music performance operation performed by the audio content processing software according to the present embodiment is described below.

Figure 14:
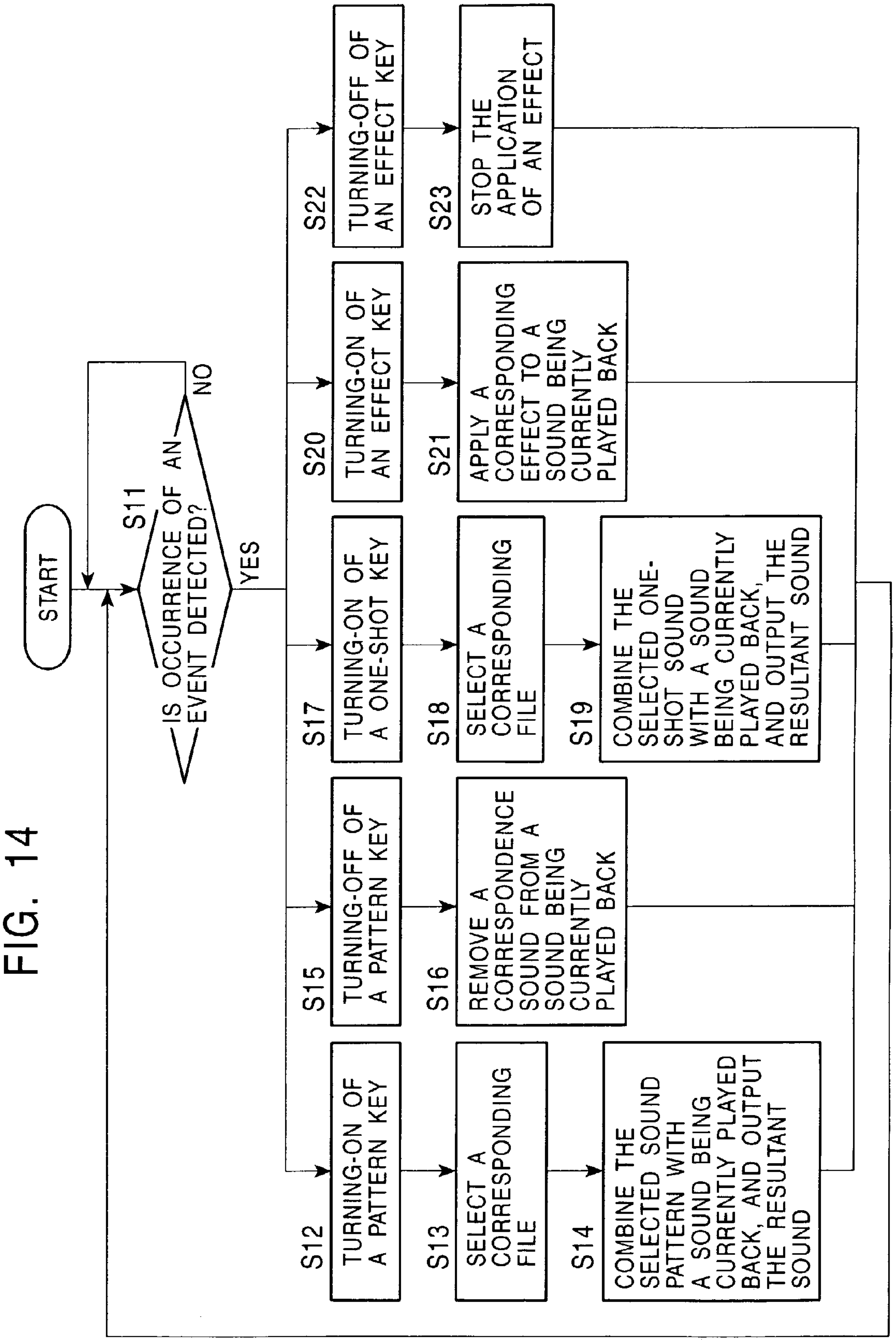
FIG. 14 is a flow chart showing a process, performed by the audio content processing software running on the computer system, to capture, in real time, user inputs given via a user input device such as a keyboard or a mouse and play music in response to the user inputs.

In the music performance operation performed by the audio content processing software running on the computer system 100, user inputs issued via the user input device such as the keyboard 112 or the mouse 113 are captured in real time into the computer system 100, and music is played in response to the user inputs. FIG. 14 is a flow chart showing processing steps of capturing a user input in real time via the user input device such as the keyboard 112 or the mouse 113 and playing music.

In the computer system 100, if a user operation such as key pressing or dragging is performed on the keyboard 112 or the mouse 113, the input device interface 104 generates an event, that is, issues an interrupt request (IRQ) to the CPU 101. In response to the interrupt request, the CPU 101 executes an interrupt handler corresponding to the interrupt request, thereby interpreting the content (scan code) of the key input and/or detecting coordinates or changes in coordinates pointed to by the mouse (step S11).

In a case in which the generated event is pressing a pattern key (step S12), a file of a sound pattern, which has been assigned to the pressed pattern key via the pack manager, is selected (step S13), and the sound pattern is played back (step S14). In a case in which a pattern key is pressed when another sound chip is being played, a sound pattern corresponding to the newly pressed key is superimposed to the sound pattern being currently played back. In a case in which the pattern key is toggled-on, the corresponding sound pattern is continuously played.

If the generated event is releasing (or toggling off) a pattern key (step S15), a sound pattern corresponding to the released (toggled-off) pattern key is removed from sound chips being played (step S16).

If the generated event is pressing a one-shot key (step S17), a file of a one-shot pattern, which has been assigned to the pressed one-shot key via the pack manager, is selected (step S18), and the one-shot sound is superimposed on the music being played (step S19). In a case in which a one-shot key is pressed when another one-shot pattern is being played, the current one-shot pattern is cancelled and the newly input one-shot pattern is played.

If the generated event is pressing an effect key (step S20), an effect, which has been assigned to the pressed effect key via the pack manager, is applied to music being played (step S21). In a case in which the effect key is toggled-on, the corresponding effect is continuously applied to the music being played.

If the generated event is releasing (or toggling off) an effect key (step S22), a corresponding effect applied to music being played is cancelled (step S23).

The present invention has been described in detail above with reference to particular embodiments. It will be apparent to those skilled in the art that various modifications and substitution to those embodiments may be made in the embodiment chosen for illustration without departing from the spirit and scope of the invention. That is, the embodiments have been described above by way of example and not limitation. The scope of the invention is to be determined solely by the appended claims.

As described in detail above, the present invention provides an excellent information processing apparatus, information processing method, and storage medium, which allow a user to enjoy editing and playing back a content such as an audio content via an interactive operation using a keyboard or a mouse.

The present invention also provides an excellent information processing apparatus, information processing method, and storage medium, which have a capability of simultaneously or sequentially combining a plurality of contents such as audio contents or other types of contents in response to a user input given via a user input device such as a keyboard or a mouse thereby allowing a user to interactively edit and play back contents.

The present invention also provides an excellent information processing apparatus, information processing method, and storage medium, which have a capability of instantaneously capturing a user input issued via a user input device, and simultaneously or sequentially combining a plurality of contents such as audio contents or other types of contents in response to the user input thereby allowing a user to interactively edit and play back contents.

What is claimed is:

1. An information processing apparatus having a plurality of input keys, for playing back a content, said information processing apparatus comprising:

key assigning means for assigning a content to a key;

user input detection means for detecting a user input operation performed on the key;

content output means for outputting the content corresponding to the key detected to be subjected to the user input operation, wherein said content includes an audio content and an image content, said audio content including a plurality of performance layers of a sound pattern, a one-shot pattern, and an effect, said image content including a still image or a motion image, the key assigning means assigns the audio content and the image content to the key and accepts a change to a key assignment of the content when the content is being output by the content output means;

display means for displaying a graphical user interface (GUI), the GUI including a first area displaying the image content and a second area displaying interactive buttons used to edit the audio content output by the content output means;

an input means for controlling a reproduction of the audio content based on movement of a graphic representation associated with the input means on the display means to effect digital scratching; and a control means for using an XY coordinate system that is defined such that a starting position of the input means is employed as an origin, determining changes in a position of the input means in an X direction and in a Y direction with respect to a position where the input means was located n frames before, n being a non-zero integer, calculating a change in position per unit time of the input means, and changing the reproduction of the audio content by an amount corresponding to the change in position per unit time of the input means.

2. The information processing apparatus according to claim 1, if two or more keys are detected to be simultaneously subjected to the user input operation, the content output means mixes together or superimposes contents corresponding to the two or more keys and outputs resultant mixed or superimposed contents.

3. The information processing apparatus according to claim 1, wherein if the user input operation on the key is continued, the content output means continuously outputs the content corresponding to said key throughout a period during which the user input operation is continued.

4. The information processing apparatus according to claim 1, wherein the key assigning means has a toggling capability of continuously outputting the content corresponding to the key subjected to the user input operation, even after the user input operation has been released.

5. The information processing apparatus according to claim 1, further comprising content storage means for storing the content to be output by the content output means.

6. The information processing apparatus according to claim 1, further comprising content output adjusting means for adjusting a timing of outputting, by the content output means, the content corresponding to the key when the key is operated by a user within a predetermined period.

7. The information processing apparatus according to claim 6, wherein the content output adjusting means includes timing adjustment setting means for setting an adjustment timing; the content output adjusting means determines an adjustment timing corresponding to the timing set by the timing adjustment setting means, on a basis of a number of beats per minute; and the content output adjusting means outputs the content at a time corresponding to the determined adjustment timing.

8. The information processing apparatus according to claim 1, wherein when the key is assigned a sound pattern or an effect and the key is continuously subjected to the user input operation, the content output means continuously outputs the content corresponding to said key throughout a period during which the user input operation is continued.

9. The information processing apparatus according to claim 1, wherein, the key assigning means provides a toggling capability to the key, said key being assigned a sound pattern or an effect, so that, when the toggling capability is active, the key is maintained, even after the user input operation has been released.

10. The information processing apparatus according to claim 1, wherein the key assigning means registers a first set of keys assigned sound patterns as a pattern pack, a second set of keys assigned one-shot patterns as a one-shot pack, and a third set of keys assigned effects as an effect pack.

11. The information processing apparatus according to claim 10, wherein the key assigning means registers one or more pattern packs, one or more one-shot packs, and one or more effect packs.

12. An information processing method for playing back a content in response to a user input operation performed on one or more keys, said method comprising the steps of:

assigning a content to a key;

detecting user input operation performed on the key;

outputting a content corresponding to the key detected to be subjected to the user input operation;

accepting a changing to a key assignment of the content when content is being output in said outputting, wherein said content includes an audio content and an image content, said audio content including a plurality of performance layers of a sound pattern, a one-shot pattern, and an effect, said image content including a still image or a motion image, and said assigning includes assigning the audio content and the image content to the key;

displaying a graphical user interface (GUI), the GUI including a first area displaying the image content and a second area displaying interactive buttons used to edit the audio content output by the outputting step;

controlling a reproduction of the audio content based on movement of a graphical representation associated with an input device on a display device to effect digital scratching;

using an XY coordinate system that is defined such that a starting position of the input device is employed as an origin;

determining changes in a position of the input device in an X direction and in a Y direction with respect to a position where the input device was located n frames before, n being a non-zero integer;

calculating a change in position per unit time of the input device; and changing the reproduction of the audio content by an amount corresponding to the change in position per unit time of the input device.

13. The information processing method according to claim 12, wherein in the outputting step, if two or more keys are detected to be simultaneously subjected to a user input operation, contents corresponding to said two or more keys are mixed together or superimposed and resultant mixed or superimposed contents are output.

14. The information processing method according to claim 12, wherein in said outputting step, if the user input operation on the key is continued, the content corresponding to said key is continuously output throughout a period during which the user input operation is continued.

15. The information processing method according to claim 12, wherein said detecting includes detecting an input operation performed on a toggle key, which causes the content corresponding to the key subjected to the user input operation to be continuously output even after the user input operation has been released.

16. An information processing method according to claim 12, further comprising storing a content to be output in said outputting step.

17. The information processing method according to claim 12, further comprising adjusting a timing of outputting, in said content outputting step, the content corresponding to the key when the key is operated by a user within a predetermined period.

18. The information processing method according to claim 17, wherein said adjusting comprises:

setting an adjustment timing;

determining an adjustment timing corresponding to the timing set in said timing adjustment setting step, on a basis of the number of beats per minute; and outputting the content at a time corresponding to the determined adjustment timing.

19. The information processing method according to claim 12, wherein in said outputting, when the key is assigned a sound pattern or an effect and is continuously subjected to a user input operation, the content corresponding to said key is continuously output throughout a period during which the user input operation is continued.

20. The information processing method according to claim 12, wherein said assigning includes providing a toggling capability to the key, said key being assigned a sound pattern or an effect, so that, when the toggling capability is active, the key is maintained, even after a user input operation has been released.

21. The information processing method according to claim 12, wherein said key assigning includes registering a first set of keys assigned sound patterns as a pattern pack, a second set of keys assigned one-shot patterns as a one-shot pack, and a third set of keys assigned effects as an effect pack.

22. The information processing method according to claim 21, wherein said assigning includes registering one or more pattern packs, one or more one-shot packs, and one or more effect packs.

23. A computer readable storage medium encoded with instructions, which when performed by a computer causes the computer to implement an information processing method for playing back a content in response to a user input operation performed on one or more keys, said method comprising:

assigning a content to a key;

detecting a user input operation performed on the key;

outputting the content corresponding to the key detected to be subjected to the user input operation, accepting a change to a key assignment of the content when content is being output in said outputting, wherein said content includes an audio content and an image content, said audio content including a plurality of performance layers of a sound pattern, a one-shot pattern, and an effect, said image content including a still image or a motion image, and said assigning includes assigning the audio content and the image content to the key;

displaying a graphical user interface (GUI), the GUI including a first area displaying the image content and a second area displaying interactive buttons used to edit the audio content output by the outputting step;

controlling a reproduction of the audio content based on movement of a graphical representation associated with an input device on a display device to effect digital scratching;

using an XY coordinate system that is defined such that a starting position of the input device is employed as an origin;

determining changes in a position of the input device in an X direction and in a Y direction with respect to a position where the input device was located n frames before, n being a non-zero integer;

calculating a change in position per unit time of the input device; and changing the reproduction of the audio content by an amount corresponding to the change in position per unit time of the input device.

24. An information processing apparatus having a plurality of input keys, for playing back a content, said information processing apparatus comprising:

a key assigning unit configured to assign a content to a key;

a user input detection unit configured to detect a user input operation performed on the key;

a content output unit configured to output a content corresponding to the key detected to be subjected to the user input operation, wherein said content includes an audio content and an image content, said audio content including a plurality of performance layers of a sound pattern, a one-shot pattern, and an effect, said image content including a still image or a motion image, the key assigning unit is further configured to assign the audio content and the image content to the key, and the key assigning unit is further configured accept a change to a key assignment of the content when the content is being output by the content output unit;

a display unit configured to display a graphical user interface (GUI), the GUI including a first area displaying the image content and a second area displaying interactive buttons used to edit the audio content output by the content output unit;

an input device for controlling a reproduction of the audio content based on movement of a graphic representation associated with the input device on the display unit to effect digital scratching; and a control unit configured to use an XY coordinate system that is defined such that a starting position of the input device is employed as an origin, to determine changes in a position of the input device in an X direction and in a Y direction with respect to a position where the input device was located n frames before, n being a non-zero integer, to calculate a change in position per unit time of the input device, and to change the reproduction of the audio content by an amount corresponding to the change in position per unit time of the input device.

25. The information processing apparatus of claim 1, wherein a speed of the reproduction of the audio content is based on a speed of the movement of the graphic representation associated with the input means.

26. The information processing method of claim 12, further comprising:

basing a speed of the reproduction of the audio content on a speed of the movement of the graphic representation associated with the input device.

27. The computer readable storage medium of claim 23, wherein the method further comprises:

basing a speed of the reproduction of the audio content on a speed of the movement of the graphic representation associated with the input device.

28. The information processing apparatus of claim 24, wherein a speed of the reproduction of the audio content is based on a speed of the movement of the graphic representation associated with the input device.

* * * * *